(12) United States Patent
Yang et al.

(10) Patent No.: US 11,231,293 B2
(45) Date of Patent: Jan. 25, 2022

(54) METHOD, TERMINAL, AND COMPUTER STORAGE MEDIUM FOR IDENTIFYING INFORMATION DURING NAVIGATION

(71) Applicant: TENCENT TECHNOLOGY (SHENZHEN) COMPANY LIMITED, Guangdong (CN)

(72) Inventors: Shuai Wen Yang, Shenzhen (CN); Wang Yu Xiao, Shenzhen (CN); Shu Feng Gao, Shenzhen (CN); Rui Cao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 222 days.

(21) Appl. No.: 16/351,879

(22) Filed: Mar. 13, 2019

(65) Prior Publication Data
US 2019/0212165 A1 Jul. 11, 2019

Related U.S. Application Data

(63) Continuation of application No. PCT/CN2017/109998, filed on Nov. 8, 2017.

(30) Foreign Application Priority Data

Nov. 9, 2016 (CN) .......................... 201610998925.9

(51) Int. Cl.
*G01C 21/36* (2006.01)
*G01C 21/34* (2006.01)

(52) U.S. Cl.
CPC ......... *G01C 21/3632* (2013.01); *G01C 21/34* (2013.01); *G01C 21/367* (2013.01); *G01C 21/3647* (2013.01)

(58) Field of Classification Search
None
See application file for complete search history.

(56) References Cited

U.S. PATENT DOCUMENTS 7,054,745 B1 * 5/2006 Couckuyt .............. G01C 21/26
340/995.27
7,630,832 B2 * 12/2009 Kim ................... G01C 21/3632
340/995.2

(Continued)

FOREIGN PATENT DOCUMENTS

CN 101290230 A 10/2008
CN 102564444 A 7/2012

(Continued)

OTHER PUBLICATIONS

Communication dated May 13, 2019 from the State Intellectual Property Office of the P.R.C. in application No. 201610998925.9.

(Continued)

*Primary Examiner* — Dale W Hilgendorf
*Assistant Examiner* — Alexander C. Bost
(74) *Attorney, Agent, or Firm* — Sughrue Mion, PLLC

(57) ABSTRACT

A method of identifying information during navigation is provided. Fork data is extracted from navigation data, the fork data corresponding to a road having a fork. A first node and at least two exit roads are extracted from the fork data, the at least two exit roads being roads in different directions. The fork data are identified as corresponding to a target fork in response to all of the at least two exit roads converging at the first node. A second node adjacent to the first node is queried in response to at least two exit roads not completely converging at the first node. The fork data are identified as corresponding to the target fork based on a distance between the first node and the second node meeting a preset condition.

16 Claims, 10 Drawing Sheets

(56) References Cited

U.S. PATENT DOCUMENTS

| | | | |
|---|---|---|---|
| 8,738,291 | B2 | 5/2014 | Ford et al. |
| 2004/0153242 | A1* | 8/2004 | Irie .................... G01C 21/3632 701/443 |
| 2005/0119826 | A1* | 6/2005 | Lee .................... G01C 21/3647 701/437 |
| 2007/0100545 | A1* | 5/2007 | Morita ............... G01C 21/3632 701/437 |
| 2007/0129892 | A1* | 6/2007 | Smartt ............... G01C 21/3844 702/5 |
| 2009/0281718 | A1* | 11/2009 | Gibran ................... G01C 21/32 701/532 |
| 2013/0345959 | A1* | 12/2013 | van Os ............ G08G 1/096866 701/408 |
| 2017/0008521 | A1* | 1/2017 | Braunstein ............. G08G 1/167 |
| 2017/0199051 | A1* | 7/2017 | Kim .................. G01C 21/3635 |
| 2017/0284812 | A1* | 10/2017 | Kim .................. G01C 21/3658 |

FOREIGN PATENT DOCUMENTS

| | | | | |
|---|---|---|---|---|
| CN | 102954795 | A | | 3/2013 |
| CN | 103852083 | A | | 6/2014 |
| CN | 104537834 | A | | 4/2015 |
| CN | 104850621 | A | | 8/2015 |
| CN | 104949679 | A | | 9/2015 |
| CN | 105606107 | A | * 5/2016 | ............. G01C 21/30 |
| EP | 3753614 | A1 | * 12/2020 | ......... G01C 21/3635 |
| WO | WO9057516 | A | * 11/1999 | ............. G01C 21/20 |

OTHER PUBLICATIONS

Written Opinion of the International Searching Authority, dated Feb. 11, 2018 from the International Bureau in counterpart International application No. PCT/CN2017/109998.

Communication dated Aug. 19, 2019, from the State Intellectual Property Office of People's Republic of English China in counterpart Application No. 201610998925.9.

International Search Report for PCT/CN2017/109998 dated Feb. 11, 2018 [PCT/ISA/210].

* cited by examiner

METHOD, TERMINAL, AND COMPUTER STORAGE MEDIUM FOR IDENTIFYING INFORMATION DURING NAVIGATION

CROSS-REFERENCE TO RELATED APPLICATION(S)

This application is a continuation of International Application No. PCT/CN2017/109998, filed on Nov. 8, 2017, in the Chinese Patent Office, which claims priority to Chinese Patent Application No. 201610998925.9, filed on Nov. 9, 2016, the disclosures of which are incorporated herein by reference in their entireties.

BACKGROUND

1. Field

The disclosure relates to information identification technologies, and in particular, to a method, a terminal, and a computer storage medium for identifying information during navigation.

2. Description of the Related Art

By using a navigation application on a terminal or an in-vehicle system, a vehicle-mounted navigation device, or the like, a user can plan a traffic path and navigation and can also perform locating a target object. For example, in-vehicle navigation may be implemented by using a navigation application installed in an in-vehicle system, or may be implemented by using a navigation application installed in a terminal such as a mobile phone. The navigation application may be preinstalled in the system, or may be installed by the user, or the like. Specifically, the traffic path may be simulated according to addresses of a departure point and a destination that are entered by the user, and an actual travel track of the user may be located. During navigation, forks are often encountered. A three-way fork is used as an example. It is possible to generate multiple navigation paths due to the three-way fork. In this case, how a traffic path is planned needs to be determined.

In the related art, a three-forked road is identified according to different road shapes. Three-forked road identification models are shown in FIG. 1, including: a common three-forked road denoted by a1, a leftward three-forked road denoted by a2, and a rightward three-forked road denoted by a3. In a1 to a3, three exit roads and one entrance road converge at a point denoted by 11. The identification models all meet the following identification policy: (1) There is only one entrance road; and (2) There are three and only three exit roads. However, the road shapes vary. A forked road shown in FIG. 2 also meets the identification, but three exit roads and one entrance road do not converge at a point. Instead, two exit roads and one entrance road converge at points respectively denoted by 21 and 22.

Apparently, use of the foregoing identification policy cannot distinguish between the different forks shown in FIG. 1 and FIG. 2. Therefore, identification accuracy is reduced. However, in related technologies, there is no effective solution to this problem.

SUMMARY

In view of this, embodiments provide an information identification method during navigation, a terminal, and a computer storage medium, that at least the problem in the related art in that accuracy of identifying information on a road is reduced.

According to an aspect of an exemplary embodiment, provided is a method of identifying information during navigation is provided. Fork data is extracted from navigation data, the fork data corresponding to a road having a fork. A first node and at least two exit roads are extracted from the fork data, the at least two exit roads being roads in different directions. The fork data are identified as corresponding to a target fork in response to all of the at least two exit roads converging at the first node. A second node adjacent to the first node is queried in response to at least two exit roads not completely converging at the first node. The fork data are identified as corresponding to the target fork based on a distance between the first node and the second node meeting a preset condition.

According to an aspect of another exemplary embodiment, provided is a terminal, including: at least one memory operable to store program code; and at least one processor operable to read the program code and operate as instructed by the program code, the program code including: data obtaining code configured to cause the at least one processor to extract fork data from navigation data, the fork data corresponding to a road having a fork; extraction code configured to cause the at least one processor to extract a first node and at least two exit roads from the fork data, the at least two exit roads being roads in different directions; first identification code configured to cause the at least one processor to identify the fork data as corresponding to a target fork in response to all of the at least two exit roads converging at the first node; query code configured to cause the at least one processor to query a second node adjacent to the first node in response to the at least two exit roads not completely converging at the first node; and second identification code configured to cause the at least one processor to identify the fork data as corresponding to the target fork based on a distance between the first node and the second node that meets a preset condition.

According to an aspect of still another exemplary embodiment, provided is a non-transitory computer storage medium storing instructions, which, when executed by at least one processor, cause the at least one processor to perform: extracting fork data from navigation data, the fork data corresponding to a road having a fork; extracting a first node and at least two exit roads from the fork data, the at least two exit roads being roads in different directions; identifying the fork data as corresponding to a target fork in response to all of the at least two exit roads converging at the first node; querying a second node adjacent to the first node in response to the at least two exit roads not completely converging at the first node; and identifying the fork data as corresponding to the target fork based on a distance between the first node and the second node that meets a preset condition.

According to the embodiments, navigation data is obtained, and to-be-identified road data is extracted from the navigation data. When the to-be-identified road data is fork data, a first node and at least two exit roads are extracted from the fork data. The at least two exit roads are roads in different directions. When all the at least two exit roads converges at the first node (or converges at a same node), the fork data is identified as a target fork. However, there are multiple changes in road shapes, and identification errors are easily caused when identification is performed based only on the road shapes. Therefore, identification accuracy is low. Low identification accuracy is adverse to subsequent traffic path planning and navigation. Because there is a possibility that the at least two exit roads do not converge at the first node (or converge at a same node), when the at least two exit roads do not converge at the first node (or converge at a same node), a second node adjacent to the first node is queried. When a distance between the first node and the second node meets a preset condition, the fork data is identified as a target fork. A relationship between adjacent nodes and an exit road and an entrance road is analyzed, so that the target fork can be more accurately identified, thereby improving identification accuracy and facilitating subsequent traffic path planning and navigation.

BRIEF DESCRIPTION OF THE DRAWINGS

The above and/or other aspects will become apparent and more readily appreciated by describing certain exemplary embodiments with reference to the accompanying drawings, in which.

DETAILED DESCRIPTION

Figure 1:
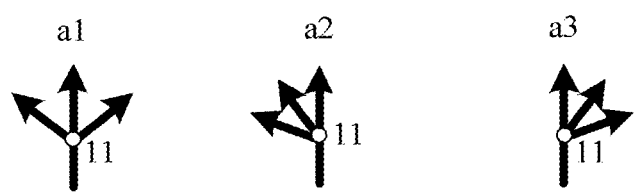
FIG. 1 is a schematic diagram of road shape distribution of a three-way fork in the related art.

The following further describes in detail implementations of the technical solutions with reference to the accompanying drawings.

A mobile terminal implementing the embodiments are now described with reference to the accompanying drawings. In the following description, suffixes of "module", "component", "unit", and the like used to denote elements are merely illustrative of the embodiments, and do not have specific meanings. Therefore, "module" and "component" can be used in combination. In addition, the terms, such as 'module' or 'unit', etc., should be understood as a unit that performs at least one function or operation and that may be embodied as hardware, software, or a combination thereof In the following detailed description, numerous details are set forth to help to thoroughly understand the disclosure. However, it is apparent to a person of ordinary skill in the art that the disclosure can be practiced without these specific details. In other instances, well-known methods, processes, components, circuits, and networks are not described in detail to avoid unnecessarily obscuring aspects of the embodiments.

Moreover, although terms "first", "second", and the like are used in this specification to describe various elements (or various thresholds, various applications, various instructions, or various operations) or the like, these elements (or thresholds, applications, instructions, or operations) should not be limited by these terms. These terms are used only to distinguish one element (or threshold, application, instruction, or operation) from another element (or threshold, application, instruction, or operation). For example, a first operation may be referred to as a second operation, and a second operation may also be referred to as a first operation, without departing from the scope of the disclosure. The first operation and the second operation are both operations, but different operations.

Steps in the embodiments are not necessarily processed in an order of the steps described. The steps may be selectively arranged to be reordered according to a requirement, or the steps in the embodiment may be deleted, or the steps in the embodiment may be added. The description of the steps in the embodiments is only an optional combination of the steps, and does not represent a combination of all the steps of the embodiments. The order of the steps in the embodiments shall not to be construed as a limitation on the disclosure.

The term "and/or" in the embodiments of the invention refers to any or all possible combinations including one or more of associated listed items. It should be further noted that when used in this specification, "include/comprise" specifies existence of stated features, integers, steps, operations, elements, and/or components. However, existence or addition of one or more other features, integers, steps, operations, elements, and/or components, and/or groups thereof is not excluded.

An intelligent terminal (such as a mobile terminal) of the embodiment may be implemented in various forms. For example, the mobile terminal described in the embodiments may include, for example, a mobile phone, a smartphone, a notebook computer, a digital broadcast receiver, a personal digital assistant (PDA), a tablet computer (PAD), a portable media player (PMP), a navigation device, or another mobile terminal, and a fixed terminal such as a digital TV or a desktop computer. In the following, it is assumed that the terminal is a mobile terminal. However, it is understood by a person skilled in the art that configurations according to the implementations of the disclosure can be applied to a fixed type of terminal in addition to components that are specially used for mobile purposes.

Figure 3:
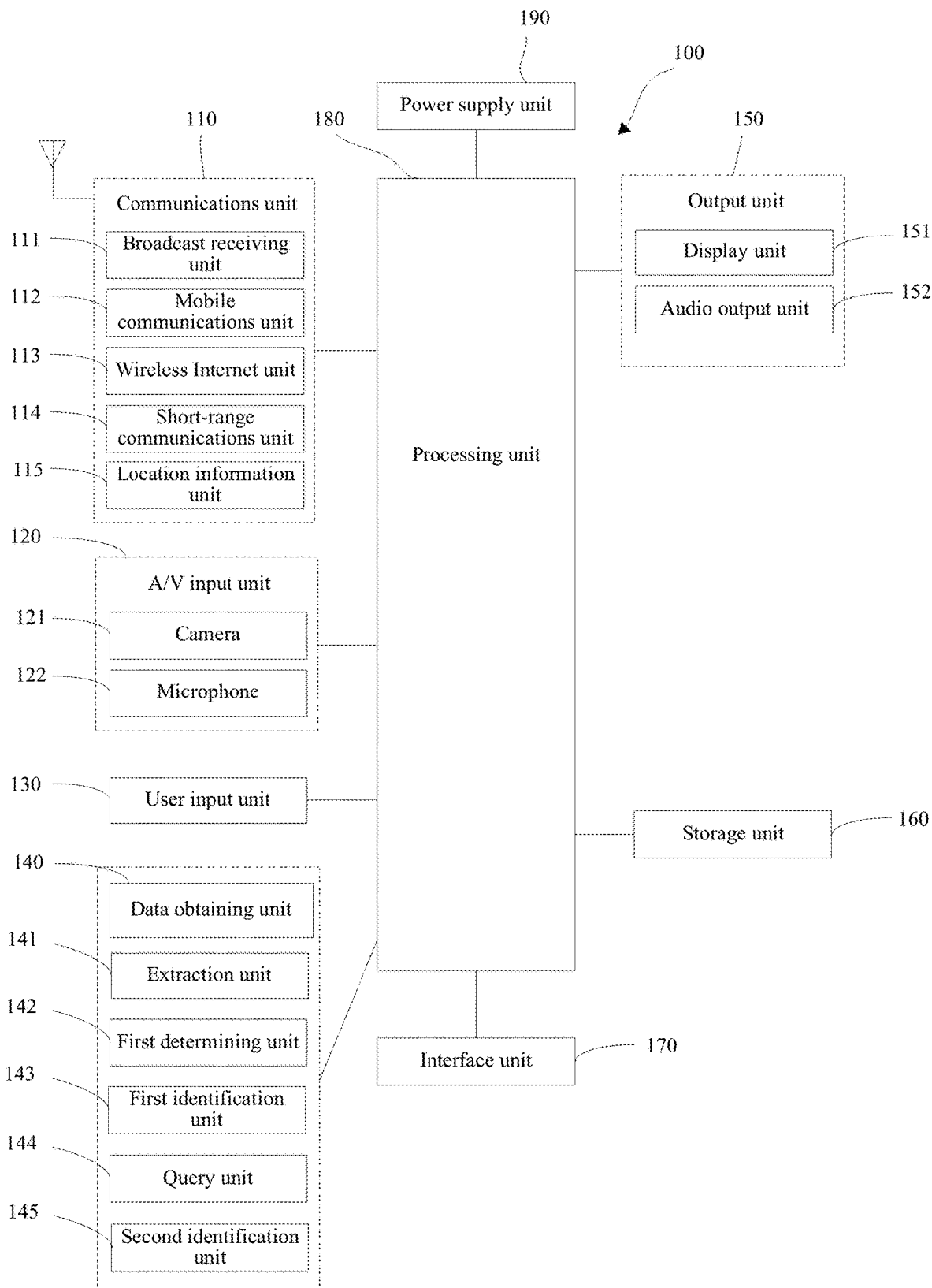
FIG. 3 is a schematic diagram of an optional hardware structure of a mobile terminal for implementing embodiments.

FIG. 3 is a schematic diagram of an optional hardware structure of a mobile terminal for implementing embodiments.

The mobile terminal 100 may include a communications unit 110, an audio/video (A/V) input unit 120, a user input unit 130, a data obtaining unit 140, an extraction unit 141, a first determining unit 142, a first identification unit 143, a query unit 144, a second identification unit 145, an output unit 150, a storage unit 160, an interface unit 170, a processing unit 180, a power supply unit 190, and the like. FIG. 3 illustrates a mobile terminal having various components, but it should be understood that not all illustrated components need to be implemented. More or fewer components may be implemented instead. The components of the mobile terminal are described in detail below.

The communications unit 110 may include one or more components that allow the mobile terminal 100 to perform radio communication with a wireless communications system or network (electrical communication may alternatively be performed in a wired manner if the mobile terminal is replaced with a fixed terminal). For example, when the communications unit is specifically a wireless communications unit, at least one of a broadcast receiving unit 111, a mobile communications unit 112, a wireless Internet unit 113, a short-range communications unit 114, and a location information unit 115 may be included. These units are optional, and can be added or deleted according to embodiments.

The broadcast receiving unit 111 receives a broadcast signal and/or broadcast-related information from an external broadcast management server through a broadcast channel. The broadcast channel may include a satellite channel and/or a terrestrial channel. The broadcast management server may be a server that generates and transmits a broadcast signal and/or broadcast-related information, or a server that receives the previously generated broadcast signal and/or broadcast-related information and transmits the broadcast signal and/or information to the terminal. The broadcast signal may include a TV broadcast signal, a radio broadcast signal, a data broadcast signal, and the like. In addition, the broadcast signal may further include a broadcast signal combined with a TV or radio broadcast signal. The broadcast-related information may also be provided through the mobile communications network, and in this case, the broadcast-related information may be received by the mobile communications unit 112. The broadcast signal may exist in various forms, for example, such as an electronic program guide (EPG) of digital multimedia broadcasting (DMB), or an electronic service guide (ESG) of digital video broadcasting-handheld (DVB-H).

The broadcast receiving unit 111 may receive a signal broadcast by using various types of broadcast systems. In particular, the broadcast receiving unit 111 may receive digital broadcasting by using digital multimedia broadcasting-terrestrial (DMB-T), digital multimedia broadcasting-satellite (DMB-S), DVB-H, a data broadcast system of media forward link only (MediaFLO), or a digital broadcast system of integrated services digital broadcasting-terrestrial (ISDB-T), or the like. The broadcast receiving unit 111 may be constructed as various broadcast systems suitable for providing broadcast signals or the foregoing digital broadcast system. The broadcast signal and/or broadcast-related information received by the broadcast receiving unit 111 may be stored in the memory 160 (or another type of storage medium).

The mobile communication unit 112 transmits a radio signal to and/or receives a radio signal from at least one of a base station (for example, an access point or a node B), an external terminal, and a server. Such radio signals may include voice call signals, video call signals, or various types of data transmitted and/or received according to text and/or multimedia messages.

The wireless Internet unit 113 supports wireless Internet access of the mobile terminal. The unit may be internally or externally coupled to the terminal. Wireless Internet access technologies involved in the unit may include Wi-Fi (Wireless Local Area Network (WLAN)), wireless broadband (Wibro), Worldwide Interoperability for Microwave Access (Wimax), and High Speed Downlink Packet Access (HSDPA), and the like.

The short-range communication unit 114 is a unit for supporting short-range communication. Some examples of short-range communication technologies include Bluetooth, radio frequency identification (RFID), the Infrared Data Association (IrDA), ultra-wideband (UWB), Zigbee, and the like.

The location information unit 115 is a unit for checking or obtaining location information of the mobile terminal. A typical example of a location information unit is a global positioning system (GPS). According to the current technology, the location information unit 115 calculates distance information and accurate time information from three or more satellites and applies triangulation to the calculated information to accurately calculate three-dimensional current location information according to longitude, latitude, and altitude. Currently, the method for calculating location and time information uses three satellites and corrects the calculated location and time information errors by using another satellite. In addition, the location information unit 115 can calculate speed information by continuously calculating the current location information in real time.

The A/V input unit 120 is configured to receive an audio or video signal. The A/V input unit 120 may include a camera 121 and a microphone 122. The camera 121 processes image data of a static picture or a video captured by an image capturing device in a video capturing mode or an image capturing mode. A processed image frame may be displayed on a display unit 151. The image frame processed by the camera 121 may be stored in the storage unit 160 (or another storage medium), or transmitted by the communications unit 110, and two or more cameras 121 may be provided according to the structure of the mobile terminal. The microphone 122 may receive sound (audio data) by using the microphone in an operation mode such as a telephone call mode, a recording mode, or a voice recognition mode, and can process such sound as audio data. The processed audio (voice) data may be converted, in the telephone call mode, to a format that can be transmitted by the mobile communications unit 112 to a mobile communications base station and output. The microphone 122 may implement various types of noise cancellation (or suppression) algorithms to cancel (or suppress) noise or interference generated during receiving and transmitting of audio signals.

The user input unit 130 may generate key input data according to a command entered by the user to control various operations of the mobile terminal. The user input unit 130 allows the user to enter various types of information, and may include a keyboard, a mouse, a touch pad (for example, a touch sensitive component that detects changes in resistance, pressure, capacitance, or the like due to contact), a scroll wheel, a shaker, and the like. In particular, when the touch panel is superimposed on the display unit 151 in the form of a layer, a touch screen can be formed.

The data obtaining unit 140 is configured to: obtain navigation data, and extract to-be-identified road data from the navigation data. The extraction unit 141 is configured to extract, when the to-be-identified road data is fork data (e.g., data of a road having a fork), a first node and at least two exit roads from the fork data, the at least two exit roads being roads in different directions. The first determining unit 142 is configured to: determine whether all of the at least two exit roads converge at the first node, and obtain a first determining result. The first identification unit 143 is configured to identify the fork data as a target fork when the first determining result is that all of the at least two exit roads converge at the first node. The query unit 144 is configured to query a second node adjacent to the first node when the first determining result is that the at least two exit roads do not completely converge at the first node. The second identification unit 145 is configured to identify the fork data as a target fork when a distance between the first node and the second node meets a preset condition.

The interface unit 170 serves as an interface through which at least one external device can connect to the mobile terminal 100. For example, the external device may include a wired or wireless headset port, an external power (or battery charger) port, a wired or wireless data port, a memory card port, a port for connecting a device having an identification unit, an audio input/output (I/O) port, a video I/O port, a headphone port, and the like. The identification unit may store various information for verifying use of the mobile terminal 100 by the user, and may include a user identity module (UIM), a subscriber identity module (SIM), a universal subscriber identity module (USIM), and the like. Moreover, the device having the identification unit (hereinafter referred to as "identification device") may be in a form of a smart card. Therefore, the identification device may be connected to the mobile terminal 100 by using a port or another connection device. The interface unit 170 may be configured to: receive input from an external device (for example, data information, or electric power), and transmit the received input to one or more components within the mobile terminal 100, or may be configured to transmit data between the mobile terminal and an external device.

Moreover, when the mobile terminal 100 is connected to an external base, the interface unit 170 may function as a path through which the electric power is supplied from the base to the mobile terminal 100, or may be used as a path through which various command signals input from the base are allowed to be transmitted to the mobile terminal. The various command signals or the electric power input from the base may be used as signals for identifying whether the mobile terminal is accurately mounted on the base. The output unit 150 is constructed to provide an output signal (for example, an audio signal, a video signal, or a vibration signal) in a visual, an audio, and/or a tactile manner. The output unit 150 may include the display unit 151, an audio output unit 152, and the like.

The display unit 151 may display information processed in the mobile terminal 100. For example, the mobile terminal 100 may display a related user interface (UI) or a graphical user interface (GUI). When the mobile terminal 100 is in a video call mode or an image capturing mode, the display unit 151 may display a captured image and/or a received image, a UI or GUI showing a video or an image and a related function, and the like.

In addition, when the display unit 151 and the touch panel are superposed on each other in a form of layers to form a touch screen, the display unit 151 may function as an input device and an output device. The display unit 151 may include at least one of a liquid crystal display (LCD), a thin film transistor LCD (TFT-LCD), an organic light-emitting diode (OLED) display, a flexible display, a three-dimensional (3D) display, and the like. Some of these displays may be constructed as transparent to allow a user to view from the outside. This may be referred to as a transparent display. A typical transparent display may be, for example, a transparent OLED (TOLED) display. According to a particular desired implementation, the mobile terminal 100 may include two or more display units (or other display devices). For example, the mobile terminal may include an external display unit (not shown) and an internal display unit (not shown). The touch screen may be configured to detect touch input pressure, a touch input location, and a touch input area.

The audio output unit 152 may convert audio data received by the communications unit 110 or stored in the memory 160 into an audio signal and output the converted audio data as sound when the mobile terminal is in a mode such as a call signal receiving mode, a call mode, a recording mode, a voice recognition mode, or a broadcast receiving mode. In addition, the audio output unit 152 may provide an audio output (for example, a call signal reception sound, or a message reception sound) related to a specific function performed by the mobile terminal 100. The audio output unit 152 may include a speaker, a buzzer, and the like.

The storage unit 160 may store a software program or the like of processing and control operations performed by the processing unit 180, or may temporarily store data (for example, a phone book, a message, a static image, or a video) that has been output or is to be output. In addition, the storage unit 160 may store data regarding various manners of vibration and audio signals that are output when a touch is applied to the touch screen.

The storage unit 160 may include at least one type of storage medium. The storage medium includes a flash memory, a hard disk, a multimedia card, a card type memory (for example, an SD or a DX memory), a random access memory (RAM), a static RAM (SRAM), a read-only memory (ROM), an electrically erasable programmable ROM (EEPROM), a programmable ROM (EEPROM), a programmable ROM (PROM), a magnetic memory, a magnetic disk, an optical disk, and the like. In addition, the mobile terminal 100 may cooperate with a network storage device that performs a storage function of the storage unit 160 through a network connection.

The processing unit 180 usually controls overall operations of the mobile terminal. For example, the processing unit 180 performs control and processing related to voice calls, data communications, video calls, and the like. For another example, the processing unit 180 may perform pattern recognition processing to recognize a handwriting input or a picture drawing input performed on the touch screen as a character or an image.

The power supply unit 190 receives external electric power or internal electric power under the control of the processing unit 180 and provides appropriate electric power required to operate the elements and components.

The various implementations described herein may be implemented in a computer readable medium using, for example, computer software, hardware, or any combination thereof. For hardware implementation, the implementations described herein may be implemented by using at least one of an application-specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit designed to perform the functions described herein. In some cases, such an implementation may be implemented in the processing unit 180. For software implementations, implementations such as processes or functions may be implemented with separate software units that are capable of performing at least one function or operation. Software code may be implemented by a software application (or program) written in any suitable programming language. The software code may be stored in the storage unit 160 and executed by the processing unit 180. A specific hardware entity of the storage unit 160 may be a memory, and a specific hardware entity of the processing unit 180 may be a controller.

In this way, the mobile terminal has been described in terms of its functions. For brevity, the following describes a slide type mobile terminal among various types of mobile terminals such as a folding type, a bar type, a swing type, a slide type mobile terminal, and the like as an example.

Therefore, the disclosure can be applied to any type of mobile terminal, and is not limited to the slide type mobile terminal.

The mobile terminal 100 shown in FIG. 3 may be constructed to be operated by using a communications system such as a wired and wireless communications system and a satellite-based communications system that transmits data by using frames or packets.

A communications system in which a mobile terminal is operable according to an embodiment is now described with reference to FIG. 4.

Such communications systems may use different air interfaces and/or physical layers. For example, an air interface used by the communications system includes, for example, Frequency Division Multiple Access (FDMA), Time Division Multiple Access (TDMA), Code Division Multiple Access (CDMA), Universal Mobile Telecommunications System (UMTS) (particularly, Long Term Evolution (LTE)), or Global System for Mobile Communications (GSM). As a non-limiting example, the following description relates to a CDMA communications system, but the disclosure is also applicable to other type of system.

Figure 4:
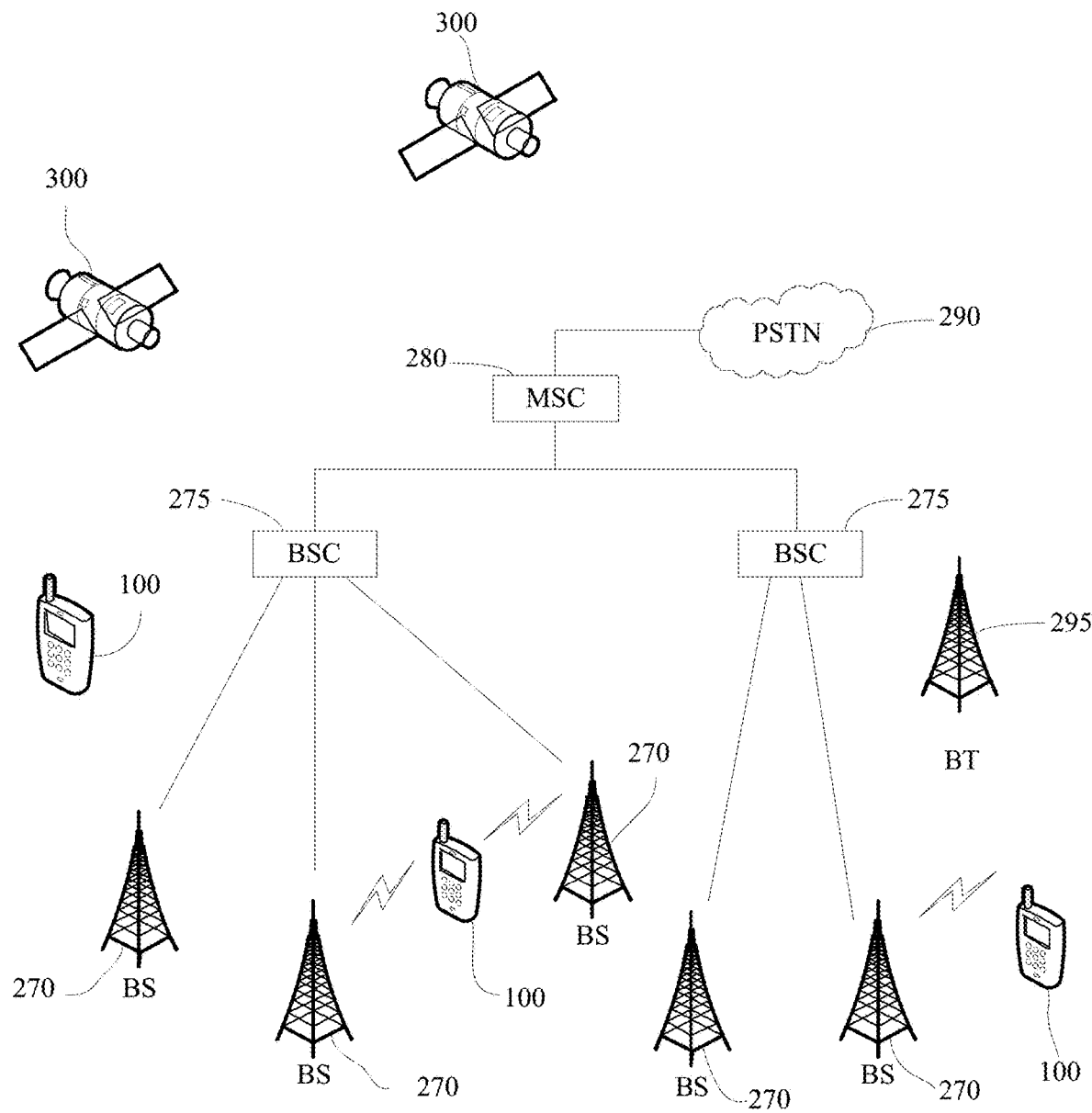
FIG. 4 is a schematic diagram of a communications system of the mobile terminal shown in FIG. 3.

Referring to FIG. 4, the CDMA wireless communications system may include multiple mobile terminals 100, multiple base stations (BS) 270, a base station controller (BSC) 275, and a mobile switching center (MSC) 280. The MSC 280 is constructed to form an interface with a public switched telephone network (PSTN) 290. The MSC 280 is also constructed to form an interface with the BSC 275 that can be coupled to the BS 270 through a backhaul line. The backhaul line may be constructed according to any one of several known interfaces, including, for example, E1/T1, ATM, IP, PPP, frame relay, HDSL, ADSL, or xDSL. It should be understood that the system shown in FIG. 4 may include multiple BSCs 275.

Each BS 270 may serve one or more partitions (or regions), with each partition covered by a multi-directional antenna or an antenna pointing in a particular direction radially away from the BS 270. Alternatively, each partition may be covered by two or more antennas for diversity reception. Each BS 270 may be constructed to support multiple frequency allocations, and each frequency allocation has a particular frequency spectrum (for example, 1.25 MHz, or 5 MHz).

An intersection of a partition and a frequency allocation may be referred to as a CDMA channel. The BS 270 may also be referred to as a base transceiver station (BTS) or another equivalent terminology. In this case, the term "base station" may be used to generally refer to a single BSC 275 and at least one BS 270. A base station may also be referred to as a "cell station". Alternatively, each partition of a particular BS 270 may be referred to as multiple cellular stations.

As shown in FIG. 4, a broadcast transmitter (BT) 295 transmits a broadcast signal to the mobile terminal 100 operating within the system. The broadcast receiving unit 111 shown in FIG. 3 is disposed at the mobile terminal 100 to receive a broadcast signal transmitted by the BT 295. In FIG. 4, several satellites 300 are shown, for example, a GPS satellite 300 may be used. The satellite 300 helps to locate at least one of the multiple mobile terminals 100.

In FIG. 4, the multiple satellites 300 are described, but it should be understood that useful locating information may be obtained by using any quantity of satellites. The location information unit 115 shown in FIG. 3 is usually constructed to cooperate with the satellite 300 to obtain desired locating information. Instead of a GPS tracking technology or in addition to a GPS tracking technology, another technology that can track the location of the mobile terminal may be used. Moreover, at least one GPS satellite 300 may selectively or additionally process satellite DMB transmission.

As a typical operation of a wireless communications system, the BS 270 receives reverse link signals from various mobile terminals 100. The mobile terminal 100 usually participates in calls, message receiving and transmitting, and other types of communications. Each reverse link signal received by a particular base station is processed within a particular BS 270. The obtained data is forwarded to a related BSC 275. The BSC provides call resource allocation and coordinated mobility management functions including a soft handoff process between the BSs 270. The BSC 275 also routes the received data to the MSC 280, which provides additional routing services for forming an interface with the PSTN 290. Similarly, the PSTN 290 forms an interface with the MSC 280, the MSC 280 forms an interface with the BSC 275, and the BSC 275 correspondingly controls the BS 270 to transmit a forward link signal to the mobile terminal 100.

The mobile communications unit 112 of the communications unit 110 in the mobile terminal accesses the mobile communications based on relevant data (including user identification information and authentication information) of the mobile communications network (such as a 2G/3G/4G mobile communications network) built in the mobile terminal, to transmit mobile communications data (including uplink mobile communications data and downlink mobile communications data) for services such as web browsing and network multimedia broadcasting for mobile terminal users.

The wireless Internet unit 113 of the communications unit 110 implements a function of a wireless hotspot by performing a related protocol function of a wireless hotspot. The wireless hotspot supports access of multiple mobile terminals (any mobile terminal other than the mobile terminal), and transmits mobile communications data (including uplink mobile communications data and downlink mobile communications data) for services such as web browsing or network multimedia playback for the mobile terminal user by reusing a mobile communications connection between the mobile communications unit 112 and the mobile communications network. Because the mobile terminal substantially reuses the mobile communications connection between the mobile terminal and the communication network to transmit the mobile communications data, traffic of the mobile communications data consumed by the mobile terminal is included in telecom expenses of the mobile terminal by a charging entity on the communications network side, thereby consuming data traffic of the mobile communications data included in the telecom expenses used by the mobile terminal for contracting.

Figure 5:
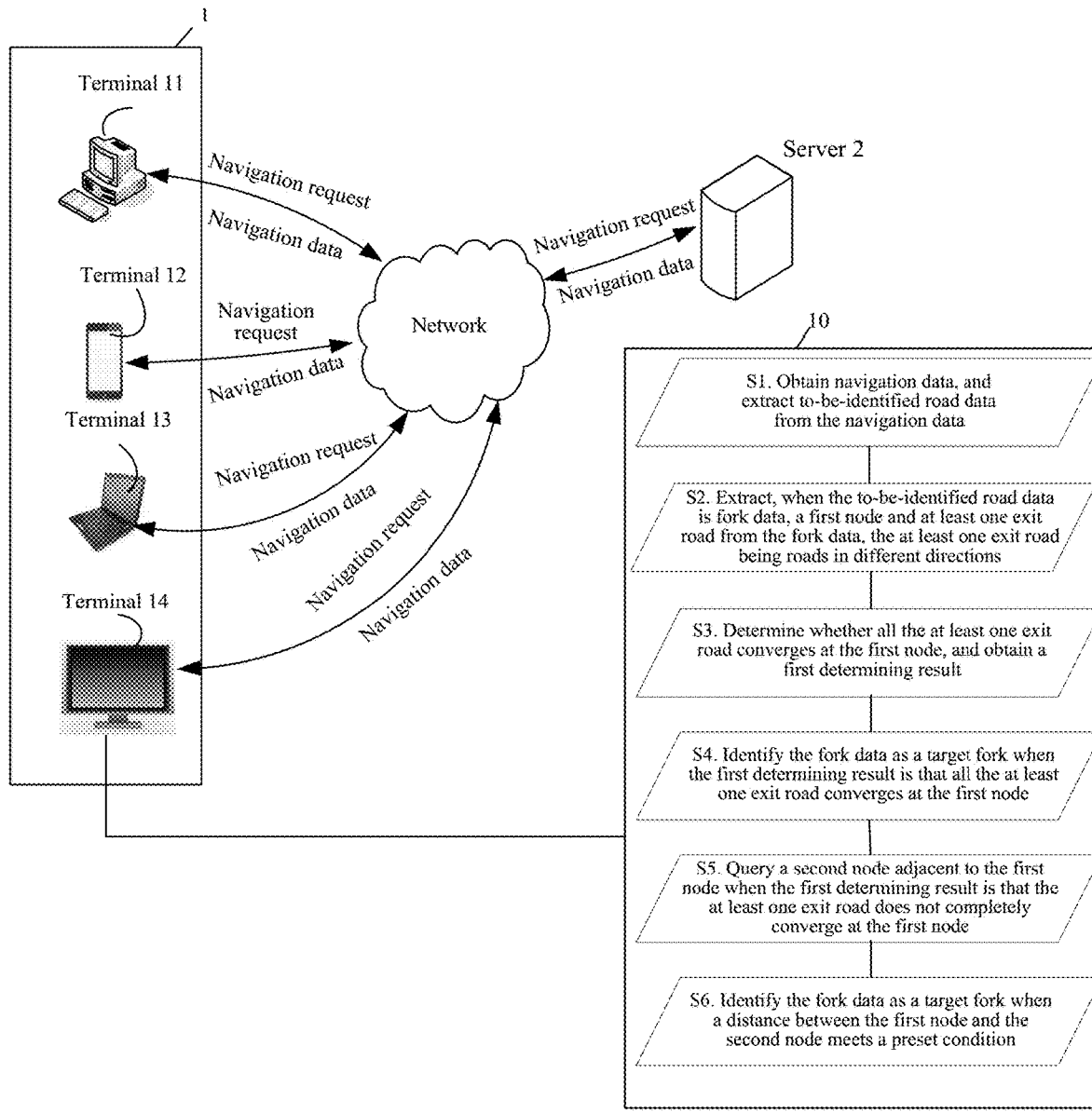
FIG. 5 is a schematic diagram of hardware entities performing information interaction according to an embodiment.

FIG. 5 is a schematic diagram of hardware entities performing information interaction according to an embodiment.

In FIG. 5, a terminal device 1 and a server 2 are included. The terminal device 1 includes terminal devices 11 to 14. The terminal device performs information interaction with the server by using a wired network or a wireless network. The terminal device includes a mobile phone, a desktop, a PC, an all-in-one, or another type. According to this embodiment, the terminal device generates a navigation request according to a departure point address and a destination address of a traffic path, and sends the navigation request to the server, to obtain navigation data from the server in real time and online. Considering that the online mode occupies network resources, the terminal device may also interact with the server in advance to obtain navigation data. The navigation data is navigation data obtained offline.

Figure 2:
FIG. 2 is a schematic diagram of road shape distribution of another three-way fork in the related art.

Subsequently, the navigation data is processed according to processing logic 10 of the terminal device, specifically, for identifying and processing fork data that affects a navigation speed with relatively high accuracy in the navigation data. According to the processing logic, first-time identification (for example, identification performed based on a basic model of a three-way fork shown in FIG. 1) and second-time identification (for example, based on the basic model of the three-way fork shown in FIG. 1, a fork shown in FIG. 2 cannot be identified, and then in the case of unsuccessful identification, identification on the three-way fork is further performed by using an advanced model of a three-way fork, thereby identifying that the fork shown in FIG. 2 is still a three-way fork) are performed.

The processing logic 10 of the terminal device is shown in FIG. 5. The processing logic 10 includes: S1: obtaining navigation data, and extracting to-be-identified road data from the navigation data; S2: extracting, when the to-be-identified road data is fork data (e.g., data of a road having a fork), a first node and at least two exit roads from the fork data, the at least two exit roads being roads in different directions; S3: determining whether all of the at least two exit roads converge at the first node, and obtaining a first determining result; S4: identifying the fork data as a target fork when the first determining result is that all of the at least two exit roads converge at the first node; S5: querying a second node adjacent to the first node when the first determining result is that the at least two exit roads do not completely converge at the first node; and S6: identifying the fork data as a target fork when a distance between the first node and the second node meets a preset condition.

In this embodiment, after the navigation data is obtained, the to-be-identified road data is extracted from the navigation data. When the to-be-identified road data is the fork data, the first node and the at least two exit roads are extracted from the fork data. The at least two exit roads are roads in different directions. It is determined whether all of the at least two exit roads converge at the first node (or converge at a same node), and if yes, the fork data is identified as the target fork. However, there are multiple changes in road shapes, and identification errors are easily caused when identification is performed based only on the road shapes. Therefore, identification accuracy is low. Low identification accuracy is adverse to subsequent traffic path planning and navigation. Because there is a possibility that the at least two exit roads do not converge at the first node (or converge at a same node), when the at least two exit roads do not converge at the first node (or converge at a same node), the second node adjacent to the first node is queried. When the distance between the first node and the second node meets the preset condition, the fork data is identified as the target fork. A relationship between adjacent nodes and an exit road and an entrance road is analyzed, so that the target fork can be more accurately identified, thereby improving identification accuracy and facilitating subsequent traffic path planning and navigation.

The foregoing example of FIG. 5 is merely an instance of a system architecture for implementing this embodiment. This embodiment is not limited to the system structure shown in FIG. 5. Based on the system architecture shown in FIG. 5, method embodiments are provided.

The foregoing processing logic 10 may be executed by the terminal device or by the server. Considering requirements for real-time navigation of the terminal device and real-time broadcast of a road condition, if the processing logic 10 is executed on the server side, experience of the terminal device may not be sufficiently high. In other words, if the processing logic 10 is performed on the server side, the process of identifying the fork data also requires multiple data interactions between the terminal device and the server, and such data interactions may cause the terminal to have no timeliness. Therefore, in the following embodiments, the processing logic is executed on the terminal device side. However, feasibility of the processing logic 10 being executed on the server side is not limited in this embodiment.

Figure 6:
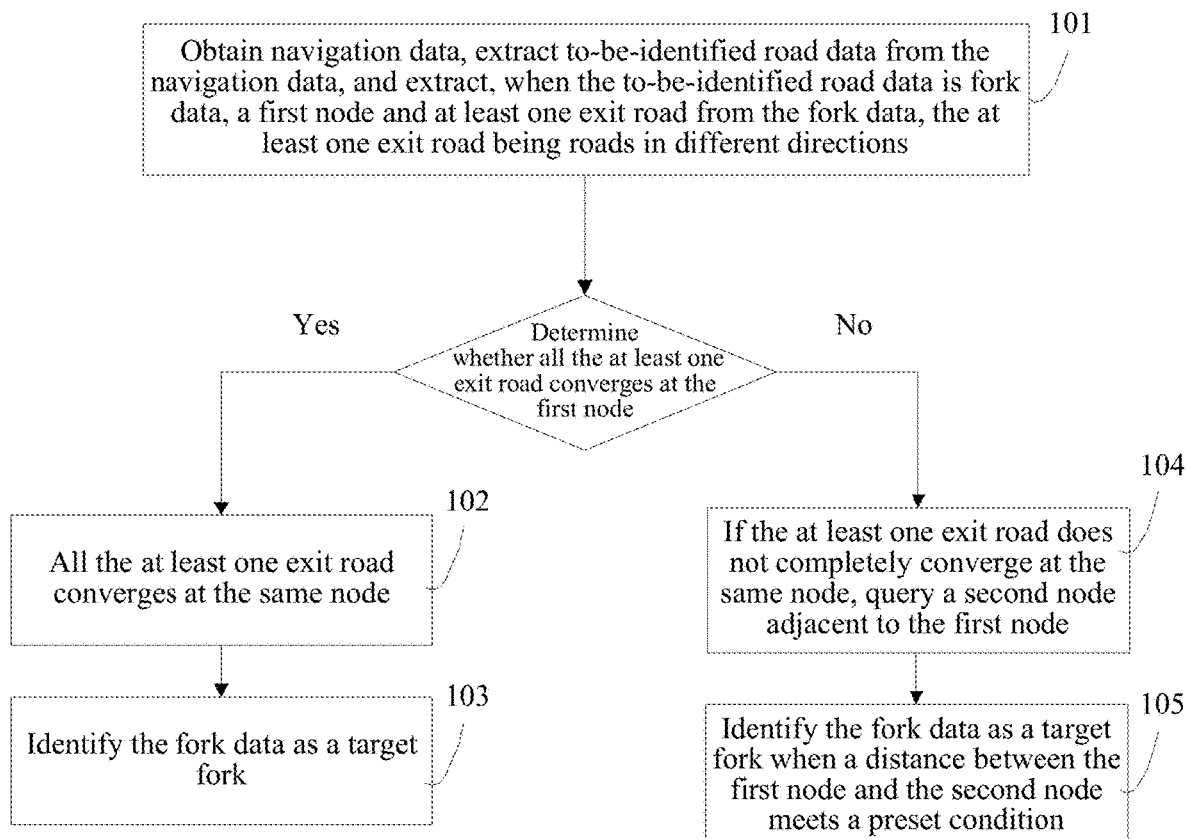
FIG. 6 is a schematic flowchart for implementing a method according to an embodiment.

An information identification method during navigation according to an embodiment is shown in FIG. 6. The method includes: obtaining navigation data, extracting to-be-identified road data from the navigation data, and extracting, when the to-be-identified road data is fork data, a first node and at least two exit roads from the fork data, the at least two exit roads being roads in different directions (101). In an actual application, to obtain better timeliness, the navigation data is preferably offline data downloaded from a server in advance. Certainly, the navigation data may also be online data. However, in such a scenario with a high real-time requirement, a preferred manner may be based on a combination of online and offline implementations. That is, only a small amount of data that needs to be updated is obtained online from the server, and most of the data (or basic data) is offline data that is downloaded from the server in advance.

1. Obtain navigation data online. For example, a navigation application installed on a terminal (such as a mobile phone terminal or an in-vehicle terminal) is used as an example. A user opens a navigation application, enters a departure point address and a destination address of a traffic path into the navigation application, generates a navigation request according to the departure point address and the destination address, and sends the navigation request to the server, to download, online from the server, one or more recommended navigation paths meeting the traffic path, for the user to select from.

2. Obtain navigation data offline. For example, if the user is located in Beijing, offline map data of Beijing is downloaded from the server in advance, and the offline map data of Beijing is stored in a terminal (such as a mobile phone terminal or an in-vehicle terminal) locally or a database inside a navigation application installed on a terminal (such as a mobile phone terminal or an in-vehicle terminal). The user enters a departure point address and a destination address of a traffic path into the navigation application, and queries the offline map data according to the departure point address and the destination address, to obtain one or more recommended navigation paths meeting the traffic path, for the user to select from. It is determined whether all of the at least two exit roads converge at the first node (for example, the determining is identification processing performed based on a basic identification policy corresponding to a basic model of a three-way fork). If yes, it indicates that all of the at least two exit roads converge at a same node, and the node is represented by the first node (102). The fork data is identified as a target fork, and may be the basic model of the three-way fork shown in FIG. 1 (103). Identification on the three-way fork is ended. Otherwise, it indicates that the at least two exit roads do not completely converge at a same node, and the node is represented by the first node. In this case, identification processing is performed based on an identification policy corresponding to an advanced model of the three-way fork. Specifically, when the at least two exit roads do not completely converge at the first node, a second node adjacent to the first node is queried (104). The identification policy corresponding to the advanced model of the three-way fork does not depend only on road shapes. In the navigation data including the fork data in an actual application, multiple roads are fishbone-shaped. Therefore, in addition to considering the fork data, "data adjacent thereto" also needs to be considered. The "data adjacent thereto" affects the identification of the fork data. The fork data is identified as a target fork when a distance between the first node and the second node meets a preset condition (that is, meets a three-forked road advanced model identification policy) (105).

Figure 7:
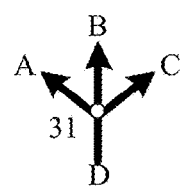
FIG. 7 is a schematic diagram of a basic model of a three-forked road according to an embodiment.

For example, FIG. 7 shows a basic model of a three-way fork. Three exit roads are denoted respectively by A, B, and C. The three exit roads converge at a same node 31. One entrance road is denoted by D.

1. A three-forked road: As shown in FIG. 7, on a driving road, roads in three different directions are separated. This intersection may be referred to as a three-forked road. Several specific road patters of the three-forked road are shown in FIG. 1.

2. A two-forked road: A road having one fewer fork than the three-forked road is a two-forked road.

3. An entrance road: a road before the three-forked road entered by a user.

4. An exit road: a road through which the user can leave the three-way fork.

5. An actual-exit road: If the user finally drives on a path A, a road denoted by A is an actual-exit road.

6. A non-actual-exit road: If the user finally drives on a path A, two roads denoted by B and C are actual-exit roads.

In the related art, the basic model of a three-way fork for identifying the three-way fork is the model shown in FIG. 7, and includes several specific road forms of a1 to a3 shown in FIG. 1. A corresponding identification policy is: if an intersection meets the following policies, it may be basically considered as a three-way fork: (1) There is only one entrance road; and (2) There are three and only three exit roads.

Due to existence of the commonly seen and special three-way fork shown in FIG. 2, in the related art, a three-forked road is identified based on shapes of roads, and the three-forked road shown in FIG. 2 and whose three exit roads are not located at a same point cannot be identified.

In contrast, according to the foregoing three-forked road advanced model identification policy of this embodiment, a road net shape in a map is analyzed and filtered, and two consecutive two-forked roads are identified as a three-forked road. Specifically, the three-way fork shown in FIG. 2 does not meet the basic model of the three-way fork shown in FIG. 1, but is a special case. However, in complex intersection data during navigation, fork data meeting FIG. 2 is very common. From the perspective of a real road map, a user still considers the intersection as a three-way fork visually. Therefore, based on the basic model of the three-way fork, the embodiments provide an advance model of the three-way fork, to perform normal identification on the fork data in FIG. 2. An advanced policy corresponding to the advanced model of the three-way fork may be as follows: (1) There is only one entrance road at an intersection; (2) There are two and only two consecutive two-forked roads, and a distance between the two two-forked roads falls within a range.

In this case, the intersection may be basically considered as a two-stage three-forked road. The advanced policy corresponding to the advanced model of the three-way fork is used, so that various types of three-way forks can be accurately identified, thereby improving identification accuracy, and facilitating subsequent navigation and locating based on the identification accuracy.

Figure 8:
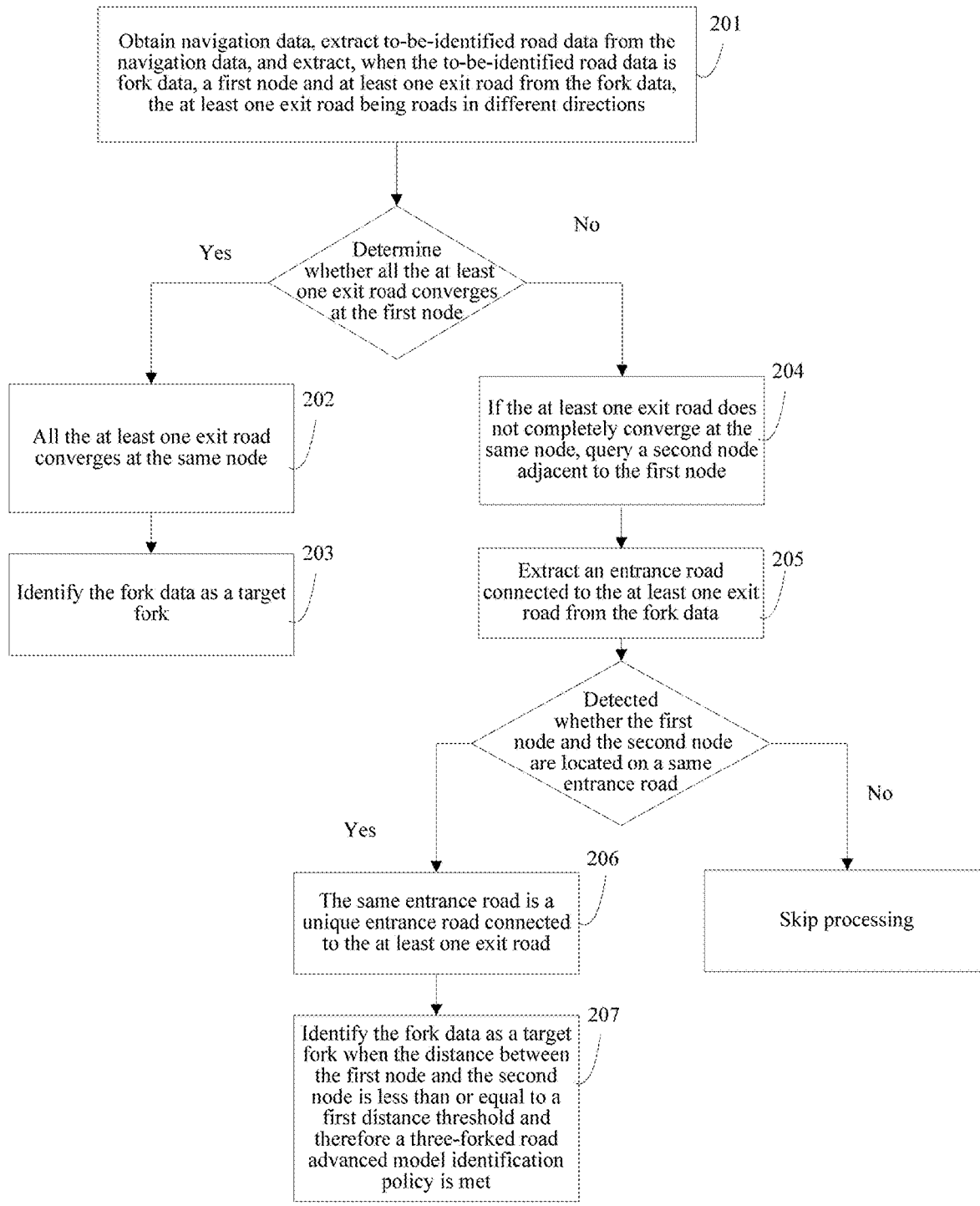
FIG. 8 is a schematic flowchart for implementing another method according to an embodiment.

An information identification method during navigation according to an embodiment is shown in FIG. 8. The method includes: obtaining navigation data, extracting to-be-identified road data from the navigation data, and extracting, when the to-be-identified road data is fork data, a first node and at least two exit roads from the fork data, the at least two exit roads being roads in different directions (201). In an actual application, to obtain better timeliness, the navigation data may be preferably offline data downloaded from the server in advance. Certainly, the navigation data may also be online data. However, in such a scenario with a high real-time requirement, a preferred manner may be based on a combination of online and offline implementations. That is, only a small amount of data that needs to be updated is obtained online from the server, and most of the data (or basic data) is offline data that is downloaded from the server in advance.

1. Obtain navigation data online. For example, a navigation application installed on a terminal (such as a mobile phone terminal or an in-vehicle terminal) is used as an example. A user opens a navigation application, enters a departure point address and a destination address of a traffic path into the navigation application, generates a navigation request according to the departure point address and the destination address, and sends the navigation request to the server, to download, online from the server, one or more recommended navigation paths meeting the traffic path, for the user to select from.

2. Obtain navigation data offline. For example, if the user is located in Beijing, offline map data of Beijing is downloaded from the server in advance, and the offline map data of Beijing is stored in a terminal (such as a mobile phone terminal or an in-vehicle terminal) locally or a database inside a navigation application installed on a terminal (such as a mobile phone terminal or an in-vehicle terminal). The user enters a departure point address and a destination address of a traffic path into the navigation application, and queries the offline map data according to the departure point address and the destination address, to obtain one or more recommended navigation paths meeting the traffic path, for the user to select from. It is determined whether all of the at least two exit roads converge at the first node (for example, the determining is identification processing performed based on a basic identification policy corresponding to a basic model of a three-way fork). If yes, it indicates that all of the at least two exit roads converge at a same node, and the node is represented by the first node (202). The fork data is identified as a target fork, and may be the basic model of the three-way fork shown in FIG. 1 (203). Identification on the three-way fork is ended. Otherwise, it indicates that the at least two exit roads do not completely converge at a same node, and the node is represented by the first node. In this case, identification processing is performed based on an identification policy corresponding to an advanced model of the three-way fork. Specifically, when the at least two exit roads do not completely converge at the first node, a second node adjacent to the first node is queried (204). The identification policy corresponding to the advanced model of the three-way fork does not depend only on road shapes. In the navigation data including the fork data in an actual application, multiple roads are fishbone-shaped. Therefore, in addition to considering the fork data, "data adjacent thereto" also needs to be considered. The "data adjacent thereto" affects the identification of the fork data. An entrance road connected to the at least two exit roads is extracted from the fork data (205). It is detected whether the first node and the second node are located on a same entrance road, and if yes, that is, the first node and the second node are located on a same entrance road, and if the same entrance road is a unique entrance road connected to the at least two exit roads, a first distance threshold meeting the preset condition is extracted (206); otherwise, processing is skipped. The fork data is identified as a target fork when the distance between the first node and the second node is less than or equal to the first distance threshold and therefore a three-forked road advanced model identification policy is met (207).

For example, FIG. 7 shows a basic model of a three-way fork. Three exit roads are denoted respectively by A, B, and C. The three exit roads converge at a same node 31. One entrance road is denoted by D.

1. A three-forked road: As shown in FIG. 7, on a driving road, roads in three different directions are separated. This intersection may be referred to as a three-forked road. Several specific road patters of the three-forked road are shown in FIG. 1.

2. A two-forked road: A road having one fewer fork than the three-forked road is a two-forked road.

3. An entrance road: a road before the three-forked road entered by a user.

4. An exit road: a road through which the user can leave the three-way fork.

5. An actual-exit road: If the user finally drives on a path A, a road denoted by A is an actual-exit road.

6. A non-actual-exit road: If the user finally drives on a path A, two roads denoted by B and C are actual-exit roads.

In the related art, the basic model of the three-way fork for identifying a three-way fork is the model shown in FIG. 7, and includes several specific road forms of a1 to a3 shown in FIG. 1. A corresponding identification policy is: if an intersection meets the following policies, it may be basically considered as a three-way fork: (1) There is only one entrance road; and (2) There are three and only three exit roads. Due to existence of the commonly seen and special three-way fork shown in FIG. 2, in the related art, a three-forked road is identified based on shapes of roads, and the three-forked road shown in FIG. 2 and whose three exit roads are not located at a same point cannot be identified.

In contrast, according to the foregoing three-forked road advanced model identification policy of this embodiment, a road net shape in a map is analyzed and filtered, and two consecutive two-forked roads are identified as a three-forked road. Specifically, the three-way fork shown in FIG. 2 does not meet the basic model of the three-way fork shown in FIG. 1, but is a special case. However, in complex intersection data during navigation, fork data meeting FIG. 2 is very common. From the perspective of a real road map, a user still considers the intersection as a three-way fork visually. Therefore, based on the basic model of the three-way fork, the embodiments provide an advance model of the three-way fork, to perform normal identification on the fork data in FIG. 2. An advanced policy corresponding to the advanced model of the three-way fork may be as follows: (1) There is only one entrance road at an intersection; and (2) There are two and only two consecutive two-forked roads, and a distance between the two two-forked roads falls within a range. In this case, the intersection may be basically considered as a two-stage three-forked road. The advanced policy corresponding to the advanced model of the three-way fork is used, so that various types of three-way forks can be accurately identified, thereby improving identification accuracy, and facilitating subsequent navigation and locating based on the identification accuracy.

An embodiment provides an information identification method during navigation. The method includes: obtaining navigation data, extracting to-be-identified road data from the navigation data, and extracting, when the to-be-identified road data is fork data, a first node and at least two exit roads from the fork data, the at least two exit roads being roads in different directions. In an actual application, to obtain better timeliness, the navigation data is preferably offline data downloaded from the server in advance. Certainly, the navigation data may also be online data. However, in such a scenario with a high real-time requirement, a preferred manner may be based on a combination of online and offline implementations. That is, only a small amount of data that needs to be updated is obtained online from the server, and most of the data (or basic data) is offline data that is downloaded from the server in advance.

1. Obtain navigation data online. For example, a navigation application installed on a terminal (such as a mobile phone terminal or an in-vehicle terminal) is used as an example. A user opens a navigation application, enters a departure point address and a destination address of a traffic path into the navigation application, generates a navigation request according to the departure point address and the destination address, and sends the navigation request to the server, to download, online from the server, one or more recommended navigation paths meeting the traffic path, for the user to select from.

2. Obtain navigation data offline. For example, if the user is located in Beijing, offline map data of Beijing is downloaded from the server in advance, and the offline map data of Beijing is stored in a terminal (such as a mobile phone terminal or an in-vehicle terminal) locally or a database inside a navigation application installed on a terminal (such as a mobile phone terminal or an in-vehicle terminal). The user enters a departure point address and a destination address of a traffic path into the navigation application, and queries the offline map data according to the departure point address and the destination address, to obtain one or more recommended navigation paths meeting the traffic path, for the user to select from.

In this embodiment, it is determined whether all of the at least two exit roads converge at the first node (for example, the determining is identification processing performed based on a basic identification policy corresponding to a basic model of a three-way fork). If yes, it indicates that all of the at least two exit roads converge at a same node, and the node is represented by the first node. The fork data is identified as a target fork, and may be the basic model of the three-way fork shown in FIG. 1. Identification on the three-way fork is ended. Otherwise, it indicates that the at least two exit roads do not completely converge at a same node, and the node is represented by the first node. In this case, identification processing is performed based on an identification policy corresponding to an advanced model of the three-way fork.

In this embodiment, for an identification policy of an advanced model of the three-way fork, an entrance road connected to the three exit roads is extracted from the fork data; two two-way fork models are formed, when the first node and the second node are located on a same entrance road, by using each two adjacent exit roads in the three exit roads and a node, closest to the two adjacent exit roads, of the first node and the second node; and the target fork is identified as a three-way fork when the entrance road is a unique entrance road and the two two-way fork models are two consecutive two-forked roads whose distance meets a first distance threshold. In other words, there is only one entrance road, and there are two and only two consecutive two-forked roads. In addition, a distance between the two two-forked roads falls within a range. This meets an identification policy for the advanced model of the three-way fork. The identification policy of the advanced model of the three-way fork does not depend only on road shapes. In the navigation data including the fork data in an actual application, multiple roads are fishbone-shaped. Therefore, in addition to considering the fork data, "data adjacent thereto" also needs to be considered. The "data adjacent thereto" affects the identification of the fork data. For example, FIG. 7 shows a basic model of a three-way fork. Three exit roads are denoted respectively by A, B, and C. The three exit roads converge at a same node 31. One entrance road is denoted by D.

1. A three-forked road: As shown in FIG. 7, on a driving road, roads in three different directions are separated. This intersection may be referred to as a three-forked road. Several specific road patters of the three-forked road are shown in FIG. 1.

2. A two-forked road: A road having one fewer fork than the three-forked road is a two-forked road.

3. An entrance road: a road before the three-forked road entered by a user.

4. An exit road: a road through which the user can leave the three-way fork.

5. An actual-exit road: If the user finally drives on a path A, a road denoted by A is an actual-exit road.

6. A non-actual-exit road: If the user finally drives on a path A, two roads denoted by B and C are actual-exit roads.

In the related art, the basic model of a three-way fork for identifying the three-way fork is the model shown in FIG. 7, and includes several specific road forms of a1 to a3 shown in FIG. 1. A corresponding identification policy is: if an intersection meets the following policies, it may be basically considered as a three-way fork: (1) There is only one entrance road; and (2) There are three and only three exit roads. Due to existence of the commonly seen and special three-way fork shown in FIG. 2, in the related art, a three-forked road is identified based on shapes of roads, and the three-forked road shown in FIG. 2 and whose three exit roads are not located at a same point cannot be identified.

In contrast, according to the foregoing three-forked road advanced model identification policy of this embodiment, a road net shape in a map is analyzed and filtered, and two consecutive two-forked roads are identified as a three-forked road. Specifically, the three-way fork shown in FIG. 2 does not meet the basic model of the three-way fork shown in FIG. 1, but is a special case. However, in complex intersection data during navigation, fork data meeting FIG. 2 is very common. From the perspective of a real road map, a user still considers the intersection as a three-way fork visually. Therefore, based on the basic model of the three-way fork, the embodiments provide an advance model of the three-way fork, to perform normal identification on the fork data in FIG. 2. An advanced policy corresponding to the advanced model of the three-way fork may be as follows: (1) There is only one entrance road at an intersection; and (2) There are two and only two consecutive two-forked roads, and a distance between the two two-forked roads falls within a range. In this case, the intersection may be basically considered as a two-stage three-forked road. The advanced policy corresponding to the advanced model of the three-way fork is used, so that various types of three-way forks can be accurately identified, thereby improving identification accuracy, and facilitating subsequent navigation and locating based on the identification accuracy.

In the related art, a filtering policy is inadequate, and some special cases are not excluded, leading to incorrect identification of a two-forked road or another intersection as a three-forked road. Compared with the related art three-forked road basic model identification policy, the three-forked road advanced model identification policy according to exemplary embodiments has the following technical benefits and improvements: the three-forked road advanced model is corrected, avoiding incorrect identification of a three-forked road. For example, identification correction is performed on the three-way fork according to a road net shape in the fork data. Specifically, this includes the following steps:

1. Detect whether there is a road with a non-traffic lane attribute in the three exit roads, and if there is a road with the non-traffic lane attribute in the three exit roads, identify the three-way fork after the road with the non-traffic lane attribute is filtered out (or excluded).

2. Detect whether there is a road with a lane attribute in the three exit roads, and if there is a road with the lane attribute in the three exit roads, identify the three-way fork after it is determined, according to an actual driving requirement, whether to filter out the road with the lane attribute. In an actual application, roads are very complicated, and it is not enough to use the three-forked road basic model identification policy, that is, to calculate a three-forked road based only on a road shape.

The exemplary embodiments further provide a correction model for identifying a three-forked road, and corresponding correction policies may be classified as: non-"lane" processing and lane processing. For the non-"lane" processing, in actual urban roads, there are many intersections whose exit roads are not roads on which vehicles can be driven. In the three-forked road model, these non-"lanes" need to be excluded, and then the intersection model is calculated. The non-"lanes" include: a pedestrian road, a non-motorized vehicle lane, an intra-residential district lane, and the like. For the lane processing, in actual urban roads, there are some such lanes on which vehicles can be driven, but the lanes are small and narrow and are not easily seen during the driving process. It needs to be determined whether to exclude the lanes according to whether to actually drive on the lanes. If a vehicle can be driven on the lanes during actual driving, the lanes are included in identification of a three-way fork. If a vehicle cannot be driven on the lanes during actual driving, these lanes need to be excluded in the three-forked road model before the intersection model is calculated.

In the related art, an angle performed by multiple roads in a road net shape is not analyzed, and an angle status may also cause incorrect identification of a two-forked road or another intersection as a three-forked road. Compared with the related art three-forked road basic model identification policy, the three-forked road advanced model identification policy according to exemplary embodiments further has the following technical benefits and improvements: the three-forked road advanced model is corrected, avoiding incorrect identification of a three-forked road. For example, identification correction is performed on the three-way fork according to an angle range in the fork data. Specifically, this includes: detecting whether the three exit roads are all located in a fan-shaped area ahead in a traveling direction, an angle range of the fan-shaped area being less than or equal to a second angle threshold, and if yes, which indicates that the three exit roads are all located in the fan-shaped area meeting a range of the second angle threshold, directly identifying the three-way fork. In an actual application, roads are very complicated, and it is not enough to use the three-forked road basic model identification policy, that is, to calculate a three-forked road based only on a road shape. The exemplary embodiments further provide a correction model for identifying a three-forked road, and corresponding correction policies may be: angle processing. The three-forked road may be distinguished from another road model. Particularly, the three-forked road is distinguished from a crossroad. The three-forked road is processed according to the angle processing. That is, it cannot be identified as a three-forked road unless three exit roads are all located within a fan-shaped area in an angle range ahead in a traveling direction.

Based on the foregoing embodiments, after correct identification and identification correction are performed on the three-way fork with reference to the three-forked road basic model identification policy and the three-forked road advanced model identification policy, the following step is further included: broadcasting data of the three-way fork for the terminal, to provide a convenient navigation service for the user of the terminal.

Figure 9:
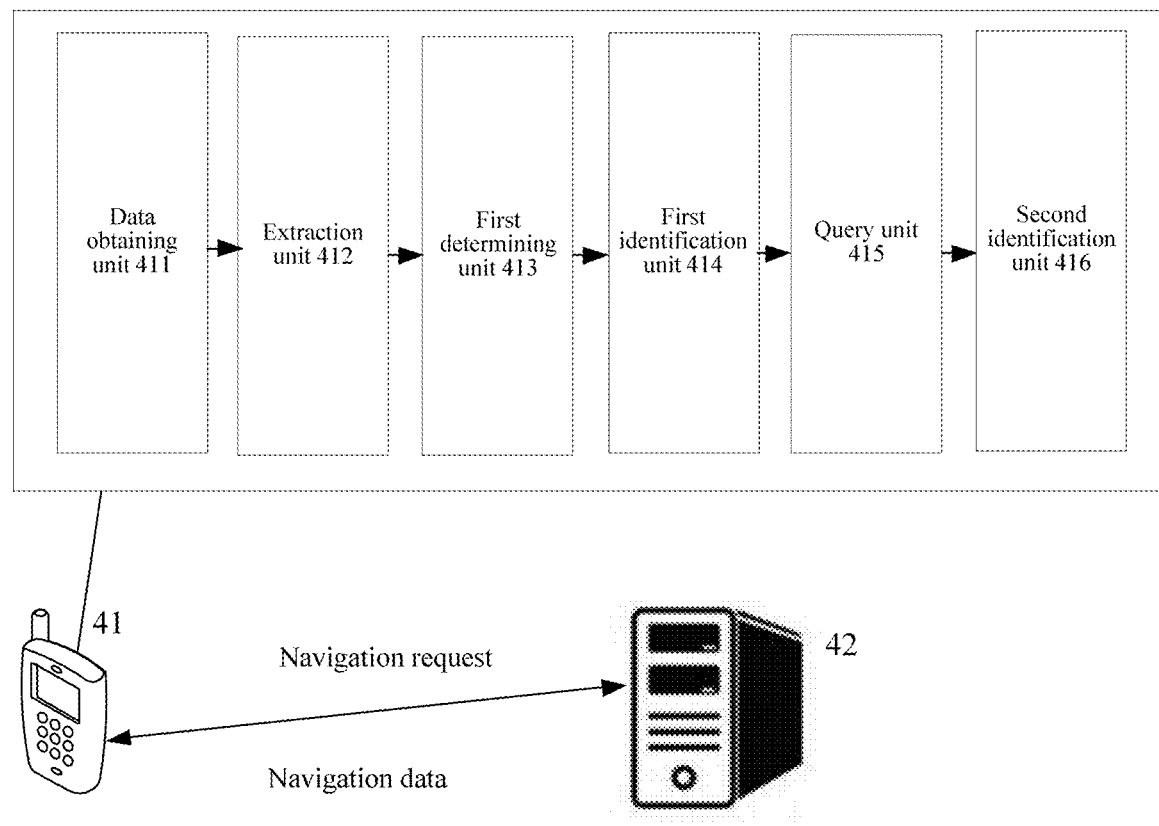
FIG. 9 is a schematic diagram of a system architecture according to an embodiment.

An information identification system during navigation according to an embodiment is shown in FIG. 9, and includes a terminal 41 and a server 42. The terminal 41 is configured to execute identification logic. The server 42 is configured to provide navigation data for the terminal in an online or offline manner. The terminal 41 includes: a data obtaining unit 411, configured to: obtain navigation data, and extract to-be-identified road data from the navigation data; an extraction unit 412, configured to extract, when the to-be-identified road data is fork data, a first node and at least two exit roads from the fork data, the at least two exit roads being roads in different directions, a first determining unit 413, configured to: determine whether all of the at least two exit roads converge at the first node, and obtain a first determining result; a first identification unit 414, configured to identify the fork data as a target fork when the first determining result is that all of the at least two exit roads converge at the first node; a query unit 415, configured to query a second node adjacent to the first node when the first determining result is that the at least two exit roads do not completely converge at the first node; and a second identification unit 416, configured to identify the fork data as a target fork when a distance between the first node and the second node meets a preset condition.

In an actual application, to obtain better timeliness, the navigation data is preferably offline data downloaded from the server in advance. Certainly, the navigation data may also be online data. However, in such a scenario with a high real-time requirement, a preferred manner may be based on a combination of online and offline implementations. That is, only a small amount of data that needs to be updated is obtained online from the server, and most of the data (or basic data) is offline data that is downloaded from the server in advance.

1. Obtain navigation data online. For example, a navigation application installed on a terminal (such as a mobile phone terminal or an in-vehicle terminal) is used as an example. A user opens a navigation application, enters a departure point address and a destination address of a traffic path into the navigation application, generates a navigation request according to the departure point address and the destination address, and sends the navigation request to the server, to download, online from the server, one or more recommended navigation paths meeting the traffic path, for the user to select from.

2. Obtain navigation data offline. For example, if the user is located in Beijing, offline map data of Beijing is downloaded from the server in advance, and the offline map data of Beijing is stored in a terminal (such as a mobile phone terminal or an in-vehicle terminal) locally or a database inside a navigation application installed on a terminal (such as a mobile phone terminal or an in-vehicle terminal). The user enters a departure point address and a destination address of a traffic path into the navigation application, and queries the offline map data according to the departure point address and the destination address, to obtain one or more recommended navigation paths meeting the traffic path, for the user to select from. Navigation data is obtained, and to-be-identified road data is extracted from the navigation data. When the to-be-identified road data is fork data, a first node and at least two exit roads are extracted from the fork data, the at least two exit roads being roads in different directions. It is determined whether all of the at least two exit roads converge at the first node (for example, the determining is identification processing performed based on a basic identification policy corresponding to a basic model of a three-way fork). If yes, it indicates that all of the at least two exit roads converge at a same node, and the node is represented by the first node. The fork data is identified as a target fork, and may be the basic model of the three-way fork shown in FIG. 1. Identification on the three-way fork is ended. Otherwise, it indicates that the at least two exit roads do not completely converge at a same node, and the node is represented by the first node. In this case, identification processing is performed based on an identification policy corresponding to an advanced model of the three-way fork. Specifically, when the at least two exit roads do not completely converge at the first node, a second node adjacent to the first node is queried. The identification policy corresponding to the advanced model of the three-way fork does not depend only on road shapes. In the navigation data including the fork data in an actual application, multiple roads are fishbone-shaped. Therefore, in addition to considering the fork data, "data adjacent thereto" also needs to be considered. The "data adjacent thereto" affects the identification of the fork data. The fork data is identified as a target fork when a distance between the first node and the second node meets a preset condition (that is, meets a three-forked road advanced model identification policy).

For example, FIG. 7 shows a basic model of a three-way fork. Three exit roads are denoted respectively by A, B, and C. The three exit roads converge at a same node 31. One entrance road is denoted by D.

1. A three-forked road: As shown in FIG. 7, on a driving road, roads in three different directions are separated. This intersection may be referred to as a three-forked road. Several specific road patters of the three-forked road are shown in FIG. 1.

2. A two-forked road: A road having one fewer fork than the three-forked road is a two-forked road.

3. An entrance road: a road before the three-forked road entered by a user.

4. An exit road: a road through which the user can leave the three-way fork.

5. An actual-exit road: If the user finally drives on a path A, a road denoted by A is an actual-exit road.

6. A non-actual-exit road: If the user finally drives on a path A, two roads denoted by B and C are actual-exit roads.

In the related art, the basic model of a three-way fork for identifying the three-way fork is the model shown in FIG. 7, and includes several specific road forms of a1 to a3 shown in FIG. 1. A corresponding identification policy is: if an intersection meets the following policies, it may be basically considered as a three-way fork: (1) There is only one entrance road; and (2) There are three and only three exit roads. Due to existence of the commonly seen and special three-way fork shown in FIG. 2, in the related art, a three-forked road is identified based on shapes of roads, and the three-forked road shown in FIG. 2 and whose three exit roads are not located at a same point cannot be identified.

In contrast, according to the foregoing three-forked road advanced model identification policy of this embodiment, a road net shape in a map is analyzed and filtered, and two consecutive two-forked roads are identified as a three-forked road. Specifically, the three-way fork shown in FIG. 2 does not meet the basic model of the three-way fork shown in FIG. 1, but is a special case. However, in complex intersection data during navigation, fork data meeting FIG. 2 is very common. From the perspective of a real road map, a user still considers the intersection as a three-way fork visually. Therefore, based on the basic model of the three-way fork, the embodiments provide an advance model of the three-way fork, to perform normal identification on the fork data in FIG. 2. An advanced policy corresponding to the advanced model of the three-way fork may be as follows: (1) There is only one entrance road at an intersection; and (2) There are two and only two consecutive two-forked roads, and a distance between the two two-forked roads falls within a range. In this case, the intersection may be basically considered as a two-stage three-forked road. The advanced policy corresponding to the advanced model of the three-way fork is used, so that various types of three-way forks can be accurately identified, thereby improving identification accuracy, and facilitating subsequent navigation and locating based on the identification accuracy.

In an implementation of this embodiment, the second identification unit is further configured to: extract an entrance road connected to the at least two exit roads from the fork data; detect whether the first node and the second node are located on a same entrance road, and obtain a first detection result; extract a first distance threshold meeting the preset condition when the first detection result is that the first node and the second node are located on the same entrance road and the same entrance road is a unique entrance road connected to the at least two exit roads; and identify the fork data as the target fork when the distance between the first node and the second node is less than or equal to the first distance threshold.

In an implementation of this embodiment, the second identification unit is further configured to: extract an entrance road connected to the three exit roads from the fork data when the at least two exit roads include three exit roads; form, when the first node and the second node are located on a same entrance road, two two-way fork models by using each two adjacent exit roads in the three exit roads and a node, closest to the two adjacent exit roads, of the first node and the second node; and identify the target fork as a three-way fork when the entrance road is a unique entrance road and the two two-way fork models are two consecutive two-forked roads whose distance meets a first distance threshold.

In an implementation of this embodiment, the terminal further includes a correction unit, configured to: perform identification correction on the three-way fork according to a road net shape in the fork data. Specifically, a solution is: detecting whether there is a road with a non-traffic lane attribute in the three exit roads, to obtain a second detection result, and when the second detection result is that there is a road with the non-traffic lane attribute in the three exit roads, identifying the three-way fork after filtering out the road with the non-traffic lane attribute. Another solution is: detecting whether there is a road with a lane attribute in the three exit roads, to obtain a third detection result, and when the third detection result is that there is a road with the lane attribute in the three exit roads, identifying the three-way fork after determining, according to an actual driving requirement, whether to filter out the road with the lane attribute.

In an implementation of this embodiment, the terminal further includes a correction unit, configured to: perform identification correction on the three-way fork according to an angle range in the fork data. Specifically, it is detected whether the three exit roads are all located in a fan-shaped area ahead in a traveling direction, an angle range of the fan-shaped area being less than or equal to a second angle threshold, to obtain a fourth detection result. The three-way fork is directly identified when the fourth detection result is that the three exit roads are all located in the fan-shaped area meeting a range of the second angle threshold.

A processor for data processing may be implemented by using a microprocessor, a central processing unit (CPU), a DSP, or an FPGA when performing processing. A storage medium includes an operation instruction. The operation instruction may be computer executable code. The operation instruction is used to implement the steps in the procedure of the information processing method in the foregoing embodiments.

It should be noted herein that the foregoing descriptions of the terminal and the server are similar to the foregoing description of the method, and beneficial effects of the terminal and the server are the same as those of the method. Details are not described again. For technical details not disclosed in the terminal and server embodiments, refer to the described content of the embodiments described in the method procedures of the disclosure.

A real application scenario is used as an example to elaborate the embodiments as follows:

In a navigation scenario, there is a problem of fork identification, regardless of whether a navigation application installed on a terminal (a mobile phone terminal or an in-vehicle terminal) or a vehicle-mounted navigation device is used.

Using the basic model of the three-way fork shown in FIG. 7 as an example, technical terms related to fork identification are described as follows:

A three-forked road: As shown in FIG. 7, on a driving road, roads in three different directions are separated and are respectively denoted by A, B, and C. This intersection may be referred to as a three-forked road.

A two-forked road: A road having one fewer fork than the three-forked road is a two-forked road.

An entrance road: a road denoted by D in FIG. 7, that is, a road before the three-forked road entered by a user. Exit road: multiple roads denoted by A, B, and C in FIG. 7, that is, roads through which the user can leave the three-way fork.

Actual-exit road: In FIG. 7, if the user finally drives on a path A, a road denoted by A is an actual-exit road.

Non-actual-exit road: In FIG. 7, if the user finally drives on a path A, two roads denoted by B and C are actual-exit roads.

In the related art, an identification policy of the basic model of the three-way fork is used. That is, if an intersection meets the following policies, it may be basically considered as a three-way fork:

1. there is only one entrance road; and
2. there are three and only three exit roads.

Calculation is performed according to different road shapes. As shown in FIG. 1, the three-forked road may be further classified into: a common three-forked road denoted by a1, a leftward three-forked road denoted by a2, and a rightward three-forked road denoted by a3. Because a three-forked road is identified based only on road shapes, only a three-forked road whose three exit roads are at a same point can be identified, and a three-forked road whose three exit roads are not at a same point cannot be identified, as shown in FIG. 2.

Figure 10:
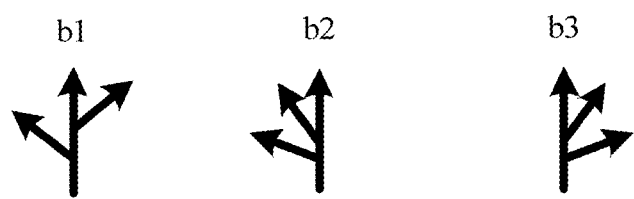
FIG. 10 is a schematic diagram of a two-stage three-forked road model according to an embodiment.

In the foregoing navigation scenario, the embodiments are used, so that an identification policy of the advanced model of the three-way fork that is different from the identification policy of the basic model of the three-way fork is improved. In the identification policy of the advance model of the three-way fork, a road net shape in a map is analyzed and filtered, so that two consecutive two-forked roads may be identified as a three-forked road. In addition, the three-forked road model is corrected by using a method regarding an angle or road filtering, so that the three-forked road model is more accurate, thereby improving accuracy and convenience during navigation by a user. For the fork shown in FIG. 2, such an intersection does not meet the foregoing definition of the basic model of the three-way fork. However, from the perspective of a real road map, the user still considers the intersection as a three-way fork visually. Therefore, based on the basic model of the three-way fork, the advanced model of the three-way fork is defined, so that calculation can be performed based on different road shapes, to accurately identify a two-stage three-forked road. Two-stage three-forked roads are shown in FIG. 10. A common two-stage three-forked road is denoted by b1, a leftward two-stage three-forked road is denoted by b2, and a rightward two-stage three-forked road is denoted by b3. If an intersection meets the following policies, it may be basically considered as a two-stage three-forked road: (1) There is only one entrance road; and (2) There are two and only two consecutive two-forked roads, and a distance between the two two-forked roads falls within a range; and (3) Descriptions in a correction policy of the three-forked road model are met.

In terms of the correction policy of the three-forked road model, because roads in China are very complicated, it is much inadequate to calculate a three-forked road based on the foregoing road shapes. Therefore, the following correction policy is added to the three-forked road model:

1. Non-"Lane" Processing

Figure 11:
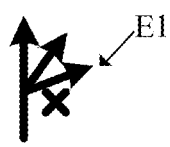
FIG. 11 to FIG. 14 are schematic diagrams of models to which a correction policy according to the embodiments is applied.

In actual urban roads, there are many intersections whose exit roads are not roads on which vehicles can be driven. In the three-forked road model, these non-"lanes" need to be excluded, and then the intersection model is calculated. As shown in FIG. 11, a pedestrian road denoted by E1 exists, and a non-lane such as the pedestrian road needs to be excluded. After the pedestrian road denoted by E1 is excluded, the intersection is actually a two-forked road. A non-"lane" includes: a pedestrian road, a non-motorized vehicle lane, an intra-residential district lane, or the like.

2. Lane Processing

Figure 12:
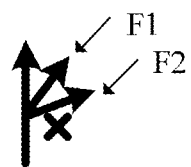
Figure 13:
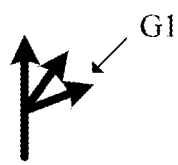

In actual urban roads, there are some lanes on which vehicles can be driven, but such lanes are small and narrow and are not easily seen during the driving process. In the three-forked road model, it needs to be determined whether to exclude the lanes according to whether to actually drive on the lanes. As shown in FIG. 12, if an actual-exit road (denoted by F1) of the user is not a lane, in the three-forked road model, a lane needs to be excluded before the intersection model is calculated. If an actual path is not a lane, a lane is excluded. In FIG. 12, after the lane is excluded, the intersection is identified as a two-forked road. As shown in FIG. 13, if an actual-exit road (denoted by G1) of the user is a lane, in the three-forked road model, the lane cannot be excluded. That is, if an actual path is a lane, the lane is not excluded, and the intersection is still identified as a three-forked road.

3. Angle Processing

Figure 14:
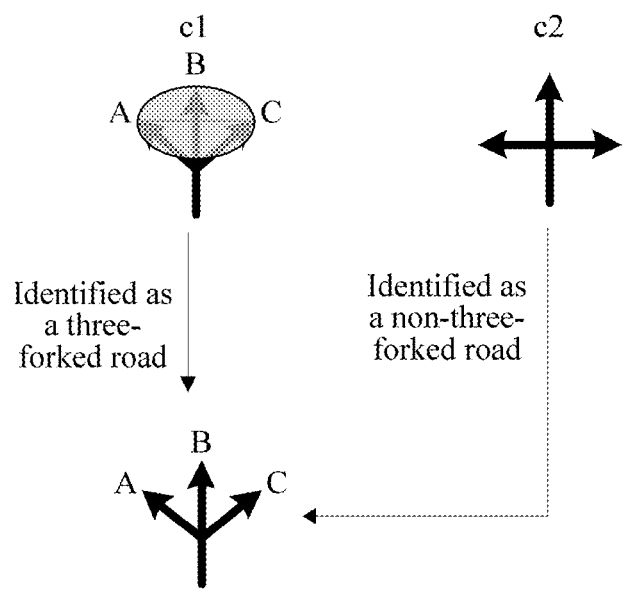

To distinguish a three-forked road (denoted by c1 in FIG. 14) from another road model, particularly, a crossroad (denoted by c2 in FIG. 14), an angle policy is used to process a three-forked road. That is, it cannot be identified as a three-forked road unless three exit roads are all located within a fan-shaped area in an angle range ahead in a traveling direction.

Figure 15:
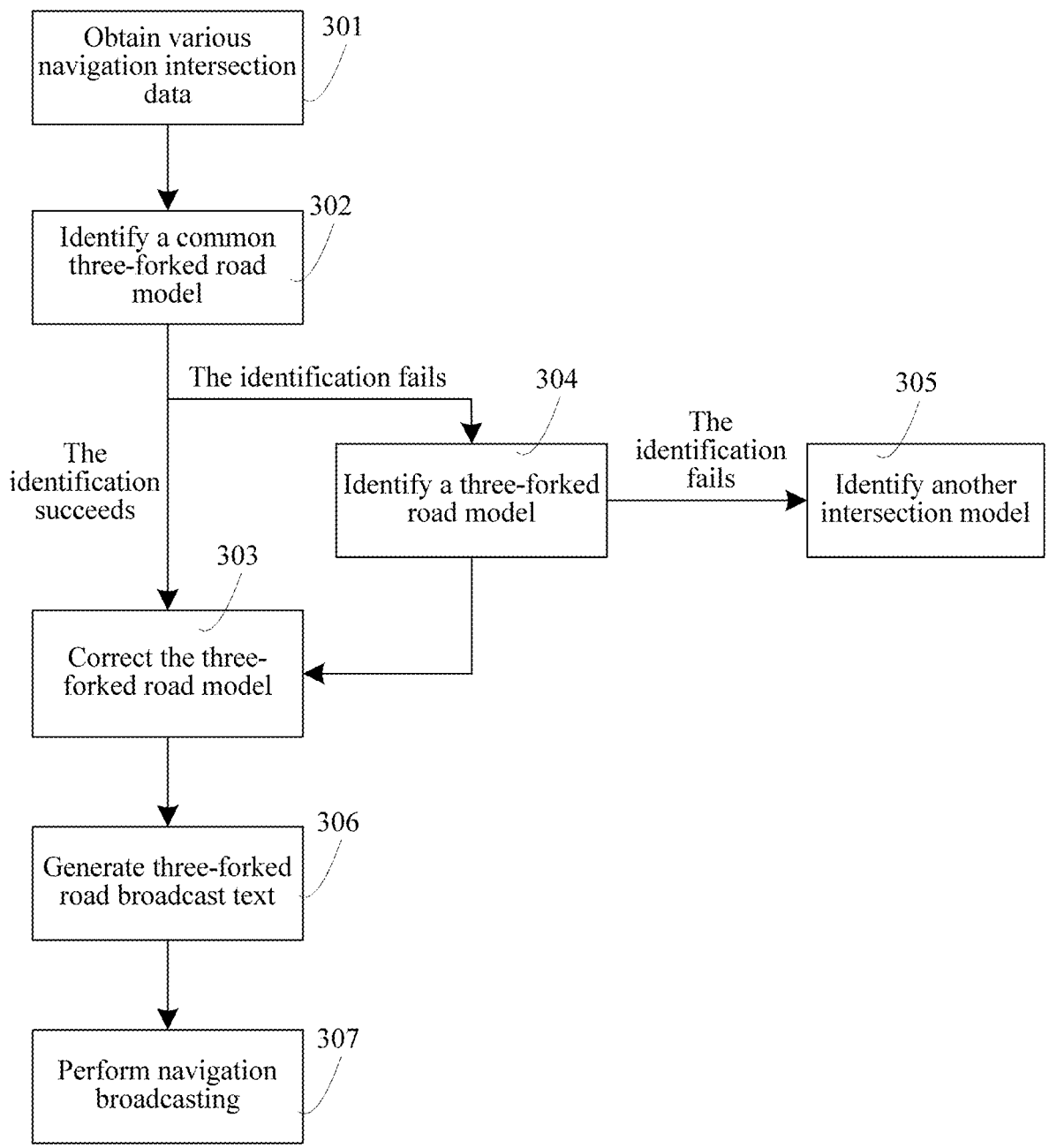
FIG. 15 is a schematic diagram of a broadcast procedure during navigation to which the embodiments are applied.

A process of identifying a three-forked road is shown in FIG. 15, including the following steps:

Step 301. Obtain various navigation intersection data.

Step 302. Identify a three-forked road in the intersection data by using a three-forked road identification policy corresponding to a common three-forked road model.

Step 303. When the identification succeeds, correct the three-forked road model. Subsequently, the process proceeds to step 306.

Step 304. When the identification fails, identify a three-forked road in the intersection data by using a three-forked road identification policy corresponding to a three-forked road advanced model. Subsequently, the process proceeds to step 303.

Step 305. When the identification of the three-forked road in the intersection data by using the three-forked road identification policy corresponding to the three-forked road advanced model fails, perform identification by using an identification policy corresponding to another intersection model.

Step 306. Generate three-forked road broadcast text.

Step 307. Perform navigation broadcasting.

Using three-forked road broadcast during actual navigation as an example, as shown in FIG. 7, multiple roads in the three-way fork are respectively denoted by A to C. Following up different driving directions of a user, the three-forked road broadcast is as follows: If the user takes path A, after XX meters, the user drives on the left side of the three-forked road. If the user takes path B, after XX meters, the user drives on the middle of the three-forked road. If the user takes path C, after XX meters, the user drives on the right side of the three-forked road. It should be noted that left, middle, and right are relative concepts. Therefore, the same broadcast is used for three road forms of "a common three-forked road, a leftward three-forked road, and a rightward three-forked road".

An exemplary embodiment further provides a computer storage medium, for example, a memory including a computer program. The computer program may be executed by a processor of a data processing device, to complete the steps in the foregoing method. The computer storage medium may be a memory such as an FRAM, a ROM, a PROM, an EPROM, an EEPROM, a flash memory, a magnetic surface memory, an optical disk, or a CD-ROM; or may be any device, such as a mobile phone, a computer, a tablet device, or a personal digital assistant that includes one of the foregoing memories.

An exemplary embodiment provides a computer readable storage medium that stores a computer program. When the computer program is run by a processor, the following steps of an information identification method during navigation are performed.

In an exemplary embodiment, when the computer program is run by a processor on a terminal side, the following steps are performed:

obtaining navigation data, and extracting to-be-identified road data from the navigation data;

extracting, when the to-be-identified road data is fork data, a first node and at least two exit roads from the fork data, the at least two exit roads being roads in different directions; and determining whether all of the at least two exit roads converge at the first node, and obtaining a first determining result; and identifying the fork data as a target fork when the first determining result is that all of the at least two exit roads converge at the first node; or querying a second node adjacent to the first node when the first determining result is that the at least two exit roads do not completely converge at the first node; and identifying the fork data as a target fork when a distance between the first node and the second node meets a preset condition.

In an embodiment, when the computer program is run by the processor on the terminal side, the following steps are further performed:

extracting an entrance road connected to the at least two exit roads from the fork data;

detecting whether the first node and the second node are located on a same entrance road, and obtaining a first detection result;

extracting a first distance threshold meeting the preset condition when the first detection result is that the first node and the second node are located on a same entrance road and the same entrance road is a unique entrance road connected to the at least two exit roads; and identifying the fork data as the target fork when the distance between the first node and the second node is less than or equal to the first distance threshold.

In an embodiment, when the computer program is run by the processor on the terminal side, the following steps are further performed:

extracting an entrance road connected to the three exit roads from the fork data;

forming, when the first node and the second node are located on a same entrance road, two two-way fork models by using each two adjacent exit roads in the three exit roads and a node, closest to the two adjacent exit roads, of the first node and the second node; and identifying the target fork as a three-way fork when the entrance road is a unique entrance road and the two two-way fork models are two consecutive two-forked roads whose distance meets a first distance threshold.

In an embodiment, when the computer program is run by the processor on the terminal side, the following step is further performed:

performing identification correction on the three-way fork according to a road net shape in the fork data.

In an embodiment, when the computer program is run by the processor on the terminal side, the following steps are further performed:

detecting whether there is a road with a non-traffic lane attribute in the three exit roads, to obtain a second detection result; and identifying, when the second detection result is that there is a road with a non-traffic lane attribute in the three exit roads, the three-way fork after filtering out the road with the non-traffic lane attribute.

In an embodiment, when the computer program is run by the processor on the terminal side, the following steps are further performed:

detecting whether there is a road with a lane attribute in the three exit roads, to obtain a third detection result; and identifying, when the third detection result is that there is a road with a lane attribute in the three exit roads, the three-way fork after determining, according to an actual driving requirement, whether to filter out the road with the lane attribute.

In an embodiment, when the computer program is run by the processor on the terminal side, the following step is further performed:

performing identification correction on the three-way fork according to an angle range in the fork data.

In an embodiment, when the computer program is run by the processor on the terminal side, the following steps are further performed:

detecting whether the three exit roads are all located in a fan-shaped area ahead in a traveling direction, an angle range of the fan-shaped area being less than or equal to a second angle threshold, to obtain a fourth detection result; and directly identifying the three-way fork when the fourth detection result is that the three exit roads are all located in the fan-shaped area meeting a range of the second angle threshold.

In the several embodiments provided in this application, it should be understood that the disclosed device and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units may be selected according to embodiments to implement the solutions of the embodiments.

In addition, functional units in the embodiments may be all integrated in a processing unit, each unit is separately used as a unit, or two or more units are integrated in a unit. The integrated unit may be implemented in a form of hardware, or may be implemented in form of hardware plus a software functional unit.

A person of ordinary skill in the art may understand that, some or all of steps for implementing the method embodiments may be implemented by using hardware related to a program instruction. The program may be stored in a computer readable storage medium. When the program is executed, the steps including the method embodiments are performed. However, the storage medium includes various types of media that may store program code, for example, a mobile storage device, a read-only memory (ROM), a random access memory (RAM), a magnetic disk, or an optical disk.

Alternatively, in the disclosure, when the integrated unit is implemented in the form of a software functional unit and sold or used as an independent product, the integrated unit may be stored in a computer-readable storage medium. Based on such an understanding, the technical solutions of the embodiments essentially, or the part contributing to the related art may be represented in a form of a software product. The computer software product is stored in a storage medium and includes several instructions for instructing a computer device (which may be a personal computer, a server, a network device, or the like) to perform all or some of the methods described in the embodiments. The foregoing storage medium includes any media that can store program code, such as a removable storage device, a ROM, a RAM, a magnetic disk, or an optical disc.

The foregoing descriptions are merely specific implementations of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

INDUSTRIAL PRACTICABILITY

According to the embodiments, navigation data is obtained first, and then to-be-identified road data is extracted from the navigation data. When the to-be-identified road data is fork data, a first node and at least two exit roads are extracted from the fork data. The at least two exit roads are roads in different directions. It is determined whether all of the at least two exit roads converge at the first node (or converge at a same node), and if yes, the fork data is identified as a target fork. However, there are multiple changes in road shapes, and identification errors are easily caused when identification is performed based only on the road shapes. Therefore, identification accuracy is low. Low identification accuracy is adverse to subsequent traffic path planning and navigation. Because there is a possibility that the at least two exit roads do not converge at the first node (or converge at a same node), when the at least two exit roads do not converge at the first node (or converge at a same node), a second node adjacent to the first node is queried. When a distance between the first node and the second node meets a preset condition, the fork data is identified as a target fork. A relationship between adjacent nodes and an exit road and an entrance road is analyzed, so that the target fork can be more accurately identified, thereby improving identification accuracy and facilitating subsequent traffic path planning and navigation.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

While a few exemplary embodiments have been described above, the scope of the disclosure is not limited thereto and various modifications and improvements made by those of ordinary skill in the art to concepts defined in the following claims should be understood to fall within the scope of the disclosure.

What is claimed is:

1. A method of identifying information during navigation, in a terminal comprising at least one processor, the method comprising:
    extracting, by the at least one processor, fork data from navigation data, the fork data corresponding to a first road having a fork;
    extracting from the fork data, by the at least one processor, a first node on an entrance road and a first exit road, a second exit road, and a third exit road, the first, second, and third exit roads being roads in different directions and one or more of the first, second, and third exit roads being connected to the first node;
    identifying, by the at least one processor, the fork data as corresponding to a three-way fork, in response to all of the first, second, and third exit roads converging at the first node and performing first navigation broadcasting to graphically represent the first road as a three-forked road at which the first, second, and third roads are separated from the first node;
    in response to not all of the first, second, and third exit roads converging at the first node, performing the following:
        querying, by the at least one processor, a second node adjacent to the first node, the second node being a node at which any of the first, second, and third exit roads not converging at the first node converges;
        identifying, by the at least one processor, the fork data as corresponding to the three-way fork, based on a distance between the first node and the second node meeting a preset condition; and
        performing second navigation broadcasting to graphically represent the first road as the three-forked road at which the first, second, and third exit roads converge and are separated at the first node, the first navigation broadcasting and the second navigation broadcasting providing the same graphical representation of the first road, the method further comprising, after the identifying the fork data as corresponding to the three-way fork, and before performing the second navigation broadcasting, performing the following:

detecting whether all of the first, second, and third exit roads are located in a fan-shaped area ahead in a traveling direction, the fan-shaped area having a center angle less than or equal to a second threshold, the second threshold being less than 180 degrees; and correcting identification of the fork data as corresponding to a non-three-way fork in response to all of the first, second, and third exit roads not being located in the fan-shaped area of which the angle range is less than or equal to the second threshold, wherein the second navigation broadcasting to graphically represent the first road as the three-forked road is not performed based on the first, second, and third exit roads being identified as the non-three-way fork.

2. The method according to claim 1, wherein the identifying the fork data as corresponding to the three-way fork based on the distance between the first node and the second node comprises:

extracting a threshold meeting the preset condition when the entrance road is a single entrance road connected to the first, second, and third exit roads; and identifying the fork data as corresponding to the three-way fork in response to the distance between the first node and the second node being less than or equal to the threshold.

3. The method according to claim 1, wherein the identifying the fork data as corresponding to the three-way fork based on the distance between the first node and the second node comprises:

forming two two-way fork models by using each two adjacent exit roads in the first, second, and third exit roads and a node, closest to the two adjacent exit roads, of the first node and the second node; and identifying the fork data as corresponding to the three-way fork in response to the entrance road being a single entrance road connected to the first, second, and third exit roads and the two two-way fork models being two consecutive two-forked roads having a distance between the two consecutive two-forked roads that meets a threshold.

4. The method according to claim 3, the method further comprising:

correcting identification of the three-way fork according to a road net shape in the fork data.

5. The method according to claim 4, wherein the correcting comprises:

in response to a road having an attribute of a non-traffic lane being present in the first, second, and third exit roads, identifying the three-way fork after filtering out the road having the attribute of the non-traffic lane.

6. The method according to claim 4, wherein the correcting comprises:

in response to a road having an attribute of a lane being present in the first, second, and third exit roads, determining whether to filter out the road having the attribute of the lane according to an actual driving requirement, and identifying the three-way fork based on a result of the determining.

7. A terminal, comprising:
at least one memory operable to store program code; and
at least one processor operable to read the program code and operate as instructed by the program code, the program code comprising:

data obtaining code configured to cause the at least one processor to extract fork data from navigation data, the fork data corresponding to a first road having a fork;

extraction code configured to cause the at least one processor to extract, from the fork data, a first node on an entrance road and a first exit road, a second exit road, and a third exit road, the first, second, and third exit roads being roads in different directions and one or more of the first, second, and third exit roads being connected to the first node;

first identification code configured to cause the at least one processor to identify the fork data as corresponding to a three-way fork in response to all of the first, second, and third exit roads converging at the first node, and perform first navigation broadcasting to graphically represent the first road as a three-forked road at which the first, second, and third roads are separated from the first node; and query code and second identification code, wherein, in response to not all of the first, second, and third exit roads converging at the first node:

the query code is configured to cause the at least one processor to query a second node adjacent to the first node, the second node being a nod at which any of the first, second, and third exit roads not converging at the first node converges; and the second identification code is configured to cause the at least one processor to:

identify the fork data as corresponding to the three-way fork based on a distance between the first node and the second node that meets a preset condition; and perform second navigation broadcasting to graphically represent the first road as the three-forked road at which the first, second, and third exit roads converge and are separated at the first node, the first navigation broadcasting and the second navigation broadcasting providing the same graphical representation of the first road, wherein the second identification code comprises first correction code configured to cause the at least one processor to, after identifying the fork data as corresponding to the three-way fork, and before performing the second navigation broadcasting, performing the following:

detecting whether all of the first, second, and third exit roads are located in a fan-shaped area ahead in a traveling direction, the fan-shaped area having a center angle less than or equal to a second threshold, the second threshold being less than 180 degrees; and correcting identification of the fork data as corresponding to a non-three-way fork in response to all of the first, second, and third exit roads not being located in the fan-shaped area of which the angle range is less than or equal to the second threshold, wherein the second navigation broadcasting to graphically represent the first road as the three-forked road is not performed based on the first, second, and third exit roads being identified as the non-three-way fork.

8. The terminal according to claim 7, wherein the second identification code comprises:

code configured to cause the at least one processor to extract a threshold meeting the preset condition in response to the entrance road being a single entrance road connected to the first, second, and third exit roads; and code configured to cause the at least one processor to identify the fork data as corresponding to the three-way fork in response to the distance between the first node and the second node being less than or equal to the threshold.

9. The terminal according to claim 7, wherein the second identification code comprises:

code configured to cause the at least one processor to form two two-way fork models by using each two adjacent exit roads in the first, second, and third exit roads and a node, closest to the two adjacent exit roads, of the first node and the second node; and code configured to cause the at least one processor to identify the fork data as corresponding to the three-way fork in response to the entrance road being a single entrance road connected to the first, second, and third exit roads and the two two-way fork models are two consecutive two-forked roads having a distance between the two consecutive two-forked roads that meets a threshold.

10. The terminal according to claim 9, wherein the program code further comprises:

second correction code configured to cause the at least one processor to correct identification of the three-way fork according to a road net shape in the fork data.

11. The terminal according to claim 10, wherein the second correction code further causes the at least one processor to:

in response to a road having an attribute of a non-traffic lane being present in the first, second, and third exit roads, identify the three-way fork after filtering out the road having the attribute of the non-traffic lane.

12. The terminal according to claim 10, wherein the second correction code further causes the at least one processor to:

in response to a road having an attribute of a lane being present in the first, second, and third exit roads, make a determination whether to filter out the road having the attribute of the lane according to an actual driving requirement, and identify the three-way fork based on a result of the determination.

13. A non-transitory computer storage medium storing instructions, which, when executed by at least one processor, cause the at least one processor to perform a method comprising:

extracting fork data from navigation data, the fork data corresponding to a first road having a fork;

extracting, from the fork data, a first node on an entrance road and a first exit road, a second exit road, and a third exit road, the first, second, and third exit roads being roads in different directions and one or more of the first, second, and third exit roads being connected to the first node;

identifying the fork data as corresponding to a three-way fork in response to all of the first, second, and third exit roads converging at the first node and performing first navigation broadcasting to graphically represent the first road as a three-forked road at which the first, second, and third roads are separated from the first node;

in response to not all of the first, second, and third exit roads converging at the first node, performing the following:

querying a second node adjacent to the first node, the second node being a node at which any of the first, second, and third exit roads not converging at the first node converges; and identifying the fork data as corresponding to the three-way fork based on a distance between the first node and the second node that meets a preset condition; and performing second navigation broadcasting to graphically represent the first road as the three-forked road at which the first, second, and third exit roads converge and are separated at the first node, the first navigation broadcasting and the second navigation broadcasting providing the same graphical representation of the first road, the method further comprising, after the identifying the fork data as corresponding to the three-way fork, and before performing the second navigation broadcasting, performing the following:

detecting whether all of the first, second, and third exit roads are located in a fan-shaped area ahead in a traveling direction, the fan-shaped area having a center angle less than or equal to a second threshold, the second threshold being less than 180 degrees; and correcting identification of the fork data as corresponding to a non-three-way fork in response to all of the first, second, and third exit roads not being located in the fan-shaped area of which the angle range is less than or equal to the second threshold, wherein the second navigation broadcasting to graphically represent the first road as the three-forked road is not performed based on the first, second, and third exit roads being identified as the non-three-way fork.

14. The non-transitory computer storage medium according to claim 13, wherein the identifying the fork data as corresponding to the three-way fork based on the distance between the first node and the second node comprises:

extracting a threshold meeting the preset condition when the entrance road is a single entrance road connected to the first, second, and third exit roads; and identifying the fork data as corresponding to the three-way fork in response to the distance between the first node and the second node being less than or equal to the threshold.

15. The non-transitory computer storage medium according to claim 13, wherein the identifying the fork data as corresponding to the three-way fork based on the distance between the first node and the second node comprises:

forming two two-way fork models by using each two adjacent exit roads in the first, second, and third exit roads and a node, closest to the two adjacent exit roads, of the first node and the second node; and identifying the fork data as corresponding to the three-way fork in response to the entrance road being a single entrance road connected to the first, second, and third exit roads and the two two-way fork models being two consecutive two-forked roads having a distance between the two consecutive two-forked roads that meets a threshold.

16. The non-transitory computer storage medium according to claim 15, wherein the instructions further cause the at least one processor to:
  correct identification of the three-way fork according to a road net shape in the fork data.

* * * * *